United States Patent [19]

Schmidt et al.

[11] 4,321,175

[45] Mar. 23, 1982

[54] COPOLYMER DISPERSIONS

[75] Inventors: Adolf Schmidt, Cologne; Werner Clarenz, Leverkusen, both of Fed. Rep. of Germany

[73] Assignee: Bayer Aktiengesellschaft, Leverkusen, Fed. Rep. of Germany

[21] Appl. No.: 100,418

[22] Filed: Dec. 5, 1979

[30] Foreign Application Priority Data

Dec. 16, 1978 [DE] Fed. Rep. of Germany ....... 2854491

[51] Int. Cl.³ ..................... C08F 220/06; C08F 2/26
[52] U.S. Cl. .................................. 524/555; 428/461; 428/537; 526/209
[58] Field of Search ................... 260/29.6 TA, 29.6 T

[56] References Cited

U.S. PATENT DOCUMENTS

| | | | |
|---|---|---|---|
| 2,767,153 | 10/1956 | Sutton | 260/29.6 TA |
| 2,787,603 | 4/1957 | Sanders | 260/29.6 TA |
| 2,866,763 | 12/1958 | Sanders | 260/29.6 TA |
| 3,206,421 | 9/1965 | Victorius | 260/29.6 TA |
| 4,097,440 | 6/1978 | Maximovich | 260/29.6 TA |
| 4,129,544 | 12/1978 | Craig | 260/29.6 TA |
| 4,139,514 | 2/1979 | Bassett | 260/29.6 TA |

FOREIGN PATENT DOCUMENTS

| | | |
|---|---|---|
| 1520533 | 5/1963 | Fed. Rep. of Germany . |
| 2452585 | 5/1976 | Fed. Rep. of Germany ..... 260/29.6 TA |
| 368567 | 4/1957 | Switzerland . |
| 1001716 | 8/1965 | United Kingdom ........ 260/29.6 TA |

*Primary Examiner*—C. A. Henderson
*Attorney, Agent, or Firm*—Connolly and Hutz

[57] ABSTRACT

40–50% by weight finely divided, stable, aqueous dispersions (particle size 0.1–0.15μ) of copolymers of copolymerized units of 20–48% by weight of acrylonitrile which may be partially substituted by styrene, 47,5–70,5% by weight of n-butyl acrylate, 3,5–4,5% by weight of methacrylic acid, which may be substituted up to 50% by acrylic acid and 0–5% by weight of N-methoxymethyl metharylamide.

The dispersions are prepared by a special process characterized by a critical combination of known process steps. The dispersions are eminently suitable for use as binders in unpigmented or pigmented aqueous dispersion paints for metal, wood, plastics and mineral substrates.

1 Claim, No Drawings

COPOLYMER DISPERSIONS

BACKGROUND OF THE INVENTION

This invention relates to a process for the preparation of aqueous dispersions based on acrylic acid-n-butyl ester/acrylonitrile/(meth)acrylic acid copolymers which are eminently suitable for use as binders in unpigmented or pigmented aqueous dispersion paints for metals, wood, plastics and mineral substrates.

It is known from German Pat. No. 980,059 that acidic, stable aqueous dispersions of copolymers of copolymerized units of 1-40% by weight of acrylonitrile, 50-95% by weight of an acrylic acid alkyl ester having 3-8 C-atoms in the alcohol component, 3-6% by weight of acrylic acid and optionally up to 20% by weight of other copolymerizable monomers can be produced by the copolymerization of the aforesaid monomers in the presence of radical formers, emulsifiers which are stable in an acidic medium, and optionally protective colloids and molecular weight regulators at temperatures of up to about 90° C. The dispersions can generally be thickened with ammonia and are used as coating compositions for textiles or glass fabrics, as binders for leather coating paints and as adhesives for paper and for synthetic resin or metal foils.

It cannot be gathered from the aforesaid document nor is it in any way suggested that special, selected monomer combinations of acrylonitrile, acrylic acid-n-butyl ester, and acrylic acid or methacrylic acid or a mixture of methacrylic and acrylic acid, in which a certain proportion of the acrylonitrile may be replaced by styrene and in which the monomer combinations may possibly contain small quantities of N-methoxymethyl methacrylamide, can be converted by a critical combination of process steps which are known per se into aqueous copolymer dispersions which are eminently suitable for use as binders for unpigmented or pigmented paints for metals, wood, synthetic resins and mineral substrates, preferably paints of this type which dry at room temperature.

U.S. Pat. No. 2,787,603 discloses inter alia the conversion of a mixture of 30 parts by weight of acrylonitrile, 65 parts by weight of n-butyl acrylate and 5 parts by weight of methacrylic acid into a copolymer dispersion (see Example IV) by emulsion polymerization and the use of the resulting dispersion, after the addition of a phenol formaldehyde resin which can be diluted with water and adjustment of the pH to about 9.4, as an oven-drying, aqueous coating composition for metal wires or ceramic substrates.

The process according to U.S. Pat. No. 2,787,603 (Example IV) can be used to prepare dispersions having a solids content of 35% by weight. The average particle size of these dispersions is below $0.1\mu$. When ammonia is added, however, these dispersions thicken to form tough pastes which are difficult to handle and which, moreover, are incompatible with pigments and therefore unsuitable for use as binders for aqueous pigmented paints. When attempts are made to employ the process according to the said U.S. patent (Examples IV + I) to prepare dispersions having a solids content of more than 40% by weight, for example 42% by weight, the dispersions obtained have a high coagulate content and when the coagulate is sieved off (average particle size of the dispersion freed from coagulate is $0.16\mu$), the addition of ammonia (10 to 25%) to adjust the pH to 8.5 thickens the dispersions to non-fluid pastes so that they are again unsuitable for use as binders for aqueous, pigmented paints (see experiments for comparison with U.S. Pat. No. 2,787,603 in the experimental part of this application).

An object of the present invention is to provide a process which yields aqueous synthetic resin dispersions with a narrow distribution of particle diameters, which preferably have a concentration of 40-50% by weight and are free from coagulate and specks, stable in storage and stable to electrolytes and shearing forces, and which are compatible with solvents and protective colloids, stable to pigments and inert to fillers, finely divided (average particle diameter about 0.1 to $0.15\mu$) and at the same time stable to freezing and thawing.

At the same time, when adjusted to a pH of 7.5 to 9, preferably 8 to 8.5, the aqueous synthetic resin dispersions should be thickened by the addition of aqueous ammonia to just the limit of flow without substantial alteration in the solids content but without the (meth)acrylic acid content falling below 3% by weight, based on the polymer.

In addition, the minimum film-forming temperature of the dispersions, determined according to DIN 53 787 (without the addition of plasticizer and/or solvent) should not be above 30° C. while the main softening range of the copolymers, determined from the maximum of damping in the torsion vibration experiment according to DIN 53 520, should be at the least 18° C. in order to ensure good film formation at very low temperatures and at the same time good blocking resistance at elevated temperatures (up to 80° C.) combined with great hardness and low tendency to soiling.

The unpigmented and pigmented films prepared from the synthetic resin dispersions should dry free from tears and pores and show good adherence to their substrate, good mechanical properties, high gloss and high blocking resistance. In addition, the dried films should be resistant to water, petroleum hydrocarbons and aromatic solvents and should be resistant to weathering.

The pigmented synthetic resin dispersions (paints) should be capable of being applied not only by the usual methods employed for synthetic resin dispersions but also by brush spreading. None of the known synthetic resin dispersions has hitherto been able to fulfil the totality of these requirements.

SUMMARY OF THE INVENTION

The problem has been solved by preparing the copolymer dispersions of the composition according to the invention by a critical combination of known process steps, using a special emulsifier.

DETAILED DESCRIPTION OF THE INVENTION

The present invention thus provides a process for the preparation of finely divided, aqueous dispersions having an average particle diameter of from 0.1 to $0.15\mu$, and a solids content of from 40-50% by weight of copolymers of copolymerized units of:

(A) 20 to 48% by weight, preferably 22 to 40% by weight, of acrylonitrile, 40 to 60% by weight of which quantity of acrylonitrile may be replaced by styrene, (B) 47.5 to 70.5% by weight, preferably 52.5 to 69.5% by weight, of n-butyl acrylate, (C) 3.5 to 4.5% by weight of methacrylic acid or a mixture of methacrylic and acrylic acid having an acrylic acid content of not more than 50% by weight, and (D) 0 to 5% by weight of N-methoxymethyl-methacrylamide, the sum of the percentage contents being 100, by emulsion polymerization and stirring with exclusion of air at temperatures of 30°–70° C., preferably 50°–65° C., until virtually complete conversion of the monomers has been achieved, in the presence of an emulsifier and a water-soluble initiator system by adding a part of the monomers (A) to (D), a part of the emulsifier dissolved in water and a part of the initiator system dissolved in water to the mixture initially introduced consisting of water, monomer mixture and emulsifier after polymerization has commenced, characterised by the combination of the following measures:

I. The following components are used:

(a) 59.7–48.4% by weight of water ($p_{H2O\ total}$) where $p_{H2O\ total} = p_{H2O\ E.v.} + p_{H2O\ Ox.v} + p_{H2O\ Red.v.} + p_{H2O\ E.n.} + p_{H2O Ox.n.} + p_{H2O\ Red.\ n.}$ (b) 40.0–50.0% by weight of monomer mixture ($p_{Mon.\ total}$) of components (A) to (D), where $p_{Mon\ total} = p_{Mon.v.} + p_{Mon.n}$, (c) 0.25–2.0% by weight of emulsifier, $p_{E.total}$, where $p_{E.total} = p_{E.v.} + p_{E.n}$, and (d) 0.025–0.4% by weight of an initiator system, $p_{I.\ total}$, where $p_{I.\ total}$ stands for $p_{I.v} + p_{I.n.} = p_{Ox.v} + p_{Red.v.} + p_{Ox.n.} + p_{Red.n.} = p_{OX.\ total} + p_{Red.total}$, and moreover the initiator system $p_{I.\ total}$ consists of potassium or ammonium peroxodisulphate or mixtures thereof or of the above-mentioned persulphates and sodium or potassium pyrosulphite or mixtures thereof, and furthermore the emulsifier is the ammonium salt of the acid sulphuric acid ester of the addition product of an average of 10 mol of ethylene oxide and 1 mol of lauryl alcohol, and the composition of the monomer mixture of monomers (A) to (D) is equal to the integral composition of the desired copolymer, and the sum of percentages by weight of components Ia to Id is 100;

II. (a) The proportion $k_{Mon.}$ of the quantity of monomer, $p_{Mon.v.}$ initially introduced to the sum of quantity of monomers initially introduced and the total quantity of water initially introduced, $$p_{H2O}v.\ total = p_{H2O\ E.v.} + p_{H2O\ Ox.v.} + p_{H2O\ Red.v.}$$

is fixed as follows:

$$k_{Mon.} = \frac{p_{Mon.v.}}{(p_{Mon.v.} + p_{H2O\ v.\ total})} \times 100 = 5.0\text{--}20,$$

preferably 7–15, (b) The concentration $[E]_v$ of the quantity of emulsifier $p_{E.v.}$ initially introduced in the total quantity of water $p_{H2O\ v.\ total}$ initially introduced is fixed as follows:

$$[E]_v = \frac{p_{E.v.}}{p_{H2O\ v.\ total}} \times 1000 = 2\text{--}40,$$

preferably 3–10, (c) The concentration $[I]_v$ of the quantity of initiator initially introduced, $P_{I.v.} = P_{Ox.v.} + P_{Red.v.}$ in the total quantity of water initially introduced, $P_{H2O\ v.\ total}$ is fixed as follows:

$$[I]_v = \frac{p_{I.v.}}{p_{H2O\ v.total}} \times 1000 = 0.5\text{--}4,$$

preferably 1.0–2.5, (d) The ratio by weight $k_I$ of pyrosulphite to persulphate is fixed to values of:

$$k_I = \frac{P_{Red.total}}{P_{Ox.total}} = 0\text{--}4, \text{ preferably } 0\text{--}1,$$

where the value 0 applies to polymerization temperatures above 55° C. and up to 70° C. and the values >0 to 4 apply to polymerization temperatures in the range of 30° to 70° C.

(e) The ratio by weight $v_{Mon.}$ of quantity of monomer initially introduced to the total quantity of monomer used is fixed as follows:

$$v_{Mon.} = \frac{p_{Mon.v.}}{(p_{Mon.v.} + p_{Mon.n.})} \times 100 = 2\text{--}15,$$

preferably 8–10;

III. The mixture initially introduced consisting of components $P_{H2O\ e.v.} + p_{Mon.v.} + p_{E.v.}$ is heated to the desired polymerization temperature in the range of 30°–70° C., components $p_{Ox.v.}$ dissolved in $p_{H2O\ Ox.v.}$ and $p_{Red.v.}$ dissolved in $p_{H2O\ Red.\ v.}$ are added simultaneously but separately while the polymerization temperature is kept constant with cooling, the remaining components $p_{Mon.n.},\ p_{E.n.}$ dissolved in $p_{H2O\ E.n.}$ and $p_{I.n.} = p_{Ox.n.} + p_{Red.n.}$ dissolved in $p_{H2O\ Ox.n.}$ and $p_{H2O\ Red.n.}$ are continuously added to the polymerizing mixture in the course of 2–8 hours, and the reaction mixture is then stirred 2–4 hours at the polymerization temperature.

The abbreviations used in the definition of the invention have the following meaning:

| | |
|---|---|
| $p_{H2O\ total}$ | = total quantity of water used for polymerization in percent by weight. |
| $p_{H2O\ v.total}$ | = total quantity of water initially introduced in percent by weight; |
| $p_{H2O\ Ox.v.}$ | = quantity of water for the oxidation component of the initiator system initially introduced in percent by weight; |
| $p_{H2O\ Red.v.}$ | = quantity of water for the reduction component of the initiator system initially introduced in percent by weight; |
| $p_{H2O\ E.n.}$ | = quantity of water for subsequently added emulsifier in percent by weight; |
| $p_{H2O\ E.v.}$ | = quantity of water for emulsifier initially introduced in percent by weight; |
| $p_{H2O\ Ox.n.}$ | = quantity of water for subsequently added oxidation component of the initiator system in percent by weight. |
| $p_{H2O\ Red.n.}$ | = quantity of water for subsequently added reduction component of the initiator system in percent by weight; |
| $p_{Mon.\ total}$ | = total quantity of monomers used in percent by weight; |
| $p_{Mon.v.}$ | = quantity of monomers initially introduced in percent by weight; |
| $p_{Mon.n.}$ | = quantity of monomers subsequently added in percent by weight; |
| $p_{E.\ total}$ | = total quantity of emulsifier in percent by weight; |
| $p_{E.v.}$ | = quantity of emulsifier initially introduced in percent by weight; |
| $p_{E.n.}$ | = quantity of subsequently added emulsifier in percent by weight; |
| $p_{I.total}$ | = total quantity of initiator system in percent by weight; |
| $p_{I.v.}$ | = quantity of initiator system initially introduced in percent by weight; |
| $p_{I.n.}$ | = quantity of subsequently added initiator |

| | | |
|---|---|---|
| $p_{Ox.v.}$ | = | quantity of oxidation component of initiator system initially introduced in percent by weight; |
| $p_{Red.v.}$ | = | quantity of reduction component of initiator system initially introduced in percent by weight; |
| $p_{Ox.n.}$ | = | quantity of subsequently added oxidation component of the initiator system in percent by weight; |
| $p_{Red.n.}$ | = | quantity of subsequently added reduction component of the initiator system in percent by weight; |
| $p_{Ox.total}$ | = | total quantity of oxidation component of the initiator system in percent by weight; |
| $p_{Red.total}$ | = | total quantity of reduction component of the initiator system in percent by weight. |

The concentrations $[E]_v$ and $[I]_v$ denote g of emulsifier or g of initiator in 1000 g of water and are non-dimensional.

Particularly preferred copolymer dispersions contain the following copolymerized units in the copolymers:

(a)
47–49% by weight of n-butyl acrylate
45–47% by weight of acrylonitrile
3.3–3.7% by weight of methacrylic acid
2.3–2.7% by weight of N-methoxymethyl-methacrylamide (b)
55–57% by weight of n-butyl acrylate
38–40% by weight of acrylonitrile
1.8–2.2% by weight of methacrylic acid
1.8–2.2% by weight of acrylic acid (c)
60–62% by weight of n-butyl acrylate
32–33% by weight of acrylonitrile
3.8–4.2% by weight of methacrylic acid
2.3–2.7% by weight of N-methoxymethyl-methacrylamide (d)
62–64% by weight of n-butyl acrylate
32–34% by weight of acrylonitrile
3.8–4.2% by weight of methacrylic acid (e)
67–69% by weight of n-butyl acrylate
24–26% by weight of acrylonitrile
3.8–4.2% by weight of methacrylic acid
2.3–2.7% by weight of N-methoxymethyl-methacrylamide.

If desired, the copolymerized units of acrylonitrile in the copolymer dispersions may be partly replaced by styrene. The copolymers of such dispersions may, for example, be composed of copolymerized units of
56–62% by weight of n-butyl acrylate,
34–40% by weight of a mixture of acrylonitrile and styrene in which the acrylonitrile portion amounts to 30 to 70% by weight,
3.5–4.5% by weight of methacrylic acid or a mixture of methacrylic and acrylic acid containing not more than 50% by weight of acrylic acid, and
0–5% by weight of N-methoxymethyl-methacrylamide.

One particularly preferred copolymer containing styrene units is composed of copolymerized units of
17–19% by weight of acrylonitrile,
17–19% by weight of styrene,
57–59% by weight of n-butyl acrylate and 3.8–4.2% by weight of methacrylic acid.

In the process according to the invention, the monomers (A) to (D) are built into the copolymer in virtually the same proportions in which they are put into the process, i.e. the composition of the mixture of monomers (A) to (D) corresponds to the integral composition of the desired copolymer.

The oxidizing component of the Redox system is potassium and/or ammonium persulphate. Of the reducing components, sodium and potassium pyrosulphite, sodium pyrosulphite is preferred for reasons of economy.

At temperatures above 55° C., the process may advantageously be carried out without a reducing component ($p_{Red.total}/p_{Ox.total}=0$).

The anionic emulsifier to be used according to the invention is the ammonium salt of the acid sulphuric acid ester of the addition product of ethylene oxide and lauryl alcohol. The ethoxylated addition product contains an average of 10 mol of ethylene oxide units, based on 1 mol of lauryl alcohol. The term "lauryl alcohol" is used in this application to include commercial lauryl alcohol with a commercial degree of purity such as, for example, the product which is available on the market under the trade name "Lorol ®-technish" (Trade Mark of Dehydrag, Federal Republic of Germany). This Lorol ®-technisch contains about 0–3% by weight of $C_{10}$ fatty alcohol, 48–58% by weight of $C_{12}$ fatty alcohol (Lauryl alcohol), 19–24% by weight $C_{14}$ fatty alcohol, 9–11% by weight of $C_{16}$ fatty alcohol and 10–13% by weight of $C_{18}$ fatty alcohol and it has an OH number of 265–275 mg KOH per g of substance.

If an emulsifier other than that indicated above is used in the process according to the invention, for example, sodium lauryl sulphate or sodium salts of paraffin sulphonates having a chain length of from 12 to 20 C-atoms or salts of sulphosuccinic acid dioctyl ester, the dispersions obtained are substantially inferior in their pigment, electrolyte and shearing stability and they have a lower surface tension and increased tendency to foaming, which is particularly troublesome when removing the residual monomers from the dispersion.

If the conditions indicated under II defined above, i.e. the quantitative ranges of the components of the reaction medium, are not observed, the particles of the dispersions obtained lie outside the range of about $0.1\mu$ to $0.15\mu$ and the dispersions either cannot be thickened with ammonia or are no longer fluid after the addition of ammonia, and they do not have the excellent compatibility with electrolytes and pigment which is characteristic of the dispersions obtained according to the invention.

The subsequent addition of further quantities of components $p_{H2O\ n.}$, $p_{Mon.n.}$, $p_{E.n.}$ and $P_{I.n.}$ to the mixture initially introduced containing components $P_{H2O\ v.\ total}$, $P_{Mon.v.}$, $P_{E.v.}$ and $p_{I.v.}$ is carried out in 2–8 hours, preferably in 4–7 hours, 2–5 hours being preferred for relatively small reaction batches (3 to about 250 kg total quantity of components) and 5 to 8 hours, in particular 6–7 hours, for larger reaction batches (about 250 to 30,000 kg total quantity of components). If the time which is allowed to elapse before these components are added is shorter than indicated, removal of the heat of polymerization, which is necessary for maintaining the desired polymerization temperature constant, becomes extremely difficult and moreover the addition of a given quantity of ammonia to dispersions obtained in this way which have virtually the same particle size causes much more pronounced thickening (beyond the flow limit)

than in the case of dispersions obtained when the components have been added after the required length of time. Longer times for the addition of components is not only uneconomical but also results in discolouration of the dispersions.

The aqueous dispersions obtained according to the invention preferably have a solids content of about 45-50% by weight and are virtually free from coagulate and specks, stable in storage and stable to electrolytes and shearing forces, compatible with solvents and protective colloids, stable to pigments and inert to fillers. They can easily be degassed. The average particle diameters of the copolymers range approximately from $>0.1\mu$ to $<0.15\ \mu$. When aqueous concentrated ammonia is added to adjust the pH to about 7.5 to 9, they are capable of thickening up to the flow limit. The average film-forming temperatures are not above 30° C. and the glass transition temperatures are at least 18° C. The main softening ranges of the polymers, determined from the logarithmic decrement of mechanical damping according to DIN 53 520, are above 30° C.

The usual auxiliary agents such as inorganic and organic pigments, preferably inorganic pigments, optical brightening agents, surface-active substances, antifoaming agents, thickeners such as cellulose ethers or esters, polyvinyl alcohol, ammonium salts of polyacrylic acid, plasticizers, fungicides, bactericides, rust inhibitors, fillers such as chalk, talcum, mica, age resistors, mouldrelease agents such as silicon oils, waxes and polyethylene and polyurethane dispersions may be added to the aqueous copolymer dispersions obtained according to the invention. As inorganic pigments or mixtures thereof there may be used, for example, titanium dioxide, calcium carbonate, iron oxides or cadmium pigments.

The aqueous paints may be prepared in the usual trituration apparatus such as dissolvers, ball mills, sand mills etc.

The aqueous paints may be applied by immersion, spread coating, spraying, flooding, knife coating, casting or similar processes and they dry free from tears and pores. They may be dried at room temperature or force dried at elevated temperatures, for example at 50°-150° C. The last mentioned process is indicated for dispersions which have film-forming temperatures above 20° C.

The aqueous paints may be used as one coat or multicoat systems on metals, mineral surfaces, plastics and wood.

The coatings are weather-resistant and distinguished by great toughness and stretchability. It has been found that the binders according to the invention can be used to prepare paints which have a distinctly lower structural viscosity and higher internal viscosity of the material ready for application than is possible with conventional dispersions. This results in improved levelling of the paint materials, which is particularly advantageous when the paints are applied by brush. The coatings are resistant to water, petroleum hydrocarbons and aromatic solvents and to weathering.

It has also been found that these binders have a high film hardness combined with a comparatively low minimum film-forming temperature.

The coatings obtained with these paints are superior in their blocking resistance and can produce a higher gloss than is possible with known dispersions.

The sum total of all the properties described renders the dispersions according to the invention suitable for application to various substrates such as metals, wood, synthetic materials and mineral surfaces. They are equally suitable for painting and interior decorating and for industrial mass produced coatings.

The parts and percentages given in the Examples and comparison experiments are based on weight unless otherwise indicated.

EXPERIMENTAL PART

1. Explanations n-Butylacrylate (abbreviated AB), acrylonitrile (ACN) and styrene (S) were used in the freshly distilled state and acrylic acid (AS) and methacrylic acid (MAS) in the commercial form with water contents of from 0.1 to 10% by weight. The parts by weight and percentages by weight of acid (S) given in the following examples, however, always refer to 100% anhydrous materials.

According to gas-chromatographic analysis, the purity of the monomers used was over 99.9% by weight in the case of AB, ACN and S and over 99.7% in the case of AS and MAS, neglecting the water content. The alkali metal persulphates and the sodium pyrosulphite used was of pA quality (pA=suitable for analysis).

The deionized water used for polymerization was freed from the atmospheric oxygen dissolved in it by boiling under reflux with simultaneous introduction of nitrogen, and it was conducted through pipes from which air was excluded to be introduced into the polymerization apparatus which were filled with inert gas (nitrogen).

Commercial lauryl alcohol of technical purity, a fatty alcohol mixture of about 48 to 58% dodecyl alcohol, 19-24% tetradecyl alcohol, 9 to 12% hexadecyl alcohol and 10 to 13% octadecyl alcohol, was used to prepare the emulsifier used in the present application. To avoid repetition, the emulsifier described here will be referred to in the following text as "emulsifier*". 1 mol of this lauryl alcohol is reacted with 10 mol of ethylene oxide under alkaline catalysts at 130° to 140° C. to form the corresponding polyglycol ether.

This intermediate product is converted into the sulphuric acid ester by reaction with 1.0 mol of chlorosulphonic acid in the usual manner, and the corresponding ammonium salt is then obtained by neutralization of the ester with aqueous ammonia. The emulsifier is in most cases used as a 35%-40% aqueous solution. The quantities of emulsifier indicated in the examples are in all cases based on 100% of detergent active substance (% WAS).

Accurate account is taken of the water in the emulsifier when drawing up the water balance of the reaction mixtures.

Emulsion polymerization was carried out in the laboratory, using a 4 liter 5-necked flask of Jena glass equipped with a motor-driven KPG stirrer according to Weygand (see C. Weygand, Chem. Techn. 16, 64, 1943) and two Teflon blades set at 90° from each other and spread apart by centrifugal force, a nitrogen inlet tube, a reflux condenser with an attached gas bubble counter, an internal thermometer or thermosensitive sleeve and connections for the pipes required to pump in the solutions or monomer mixture whilst excluding atmospheric oxygen.

Although the speed of stirring is not critical within wide limits, it is necessary on the one hand to avoid foaming due to excessively vigorous turbulence and on the other hand to avoid increased formation of precipitate and specks and reduced monomer conversion due to excessively slow stirring. Paddle mixers, horseshoe mixers and crossbeam stirrers may be used.

Stirrer speeds of about 250 revs. per min. were used in the 4 liter batch, 120 revs. per min. in the 40 liter autoclave, 80 revs per min in the 250 liter stirrer tank and 35-45 revs. per min. in the 10,000 liter autoclave.

The reaction temperature, measured in the latex, was in all cases maintained to an accuracy of about ±0.3° C. by electronic temperature controls.

The monomer mixtures containing acrylonitrile were handled in such a manner as to avoid contact with the skin or by respiration. The same applies to the crude dispersions obtained after polymerization; these were thoroughly degassed before they were used as binders so that the acrylonitrile content was below the limit which could be detected analytically.

To determine the solids content (in % by weight), latex samples were placed in cups of tin foil and dried in a circulating air drying cupboard at 180°-200° C. for 30 minutes. The values obtained in this manner agreed sufficiently with those obtained by carefully absorbing water over $CaCl_2$ to constant weight in a desiccator.

The term "coagulate" is used in the following examples to refer to all solid deposits on the stirrer, the thermometer and the wall and to all components which can be filtered off, the dispersions being filtered through polyamide fabrics having a square mesh of 60μ.

In many cases, parts of the latex were first filtered through a perlon fabric with a mesh of 200μ and the filtrate was then again filtered through a cloth with a mesh of 30μ. The coagulate was weighed both in the moist form and after drying (30 minutes at 180°-200° C.). Its weight was partly indicated in g and partly in %.

The quantities of coagulate indicated are based in most cases on a reaction mixture and give important indications of the usefulness of the various processes.

The hydrogen ion concentration or pH was determined with a commercial pH meter controlled with buffer solutions in the acid and alkaline range. The measurements were carried out at room temperature (see also DIN 53 785).

The latex particle sizes were in most cases determined by laser correlation spectroscopy (see D. E. Koppel, Journal of Chemistry Physics 57, 1972, 4814-4820). Where two values are indicated, they were obtained from the dependence of the light scattering on the angle (see M. Hofmann, H. Krömer, R. Kuhn, Polymeranalytik I, Thieme Taschenlehrbuch B 4, Georg Thieme Verlag, Stuttgart, 1977, page 298).

The viscosity of the dispersions was measured at various pH values, using either a DIN 53 211 outflow cup or a Brookfield synchrolectric viscosimeter, Model LVF, precision instrument of Brookfield Engineering Laboratories, Inc. The measurements in the latter case were carried out at a temperature of 22° C., using the four different test bodies (PK 1 to 4) or "spindles 1-4" provided with this apparatus, at the following speeds of rotation: 6, 12, 20, 60 revs. per min.

Since the viscosity depends not only on the pH but also on the solids content of the dispersion, the latter is indicated in brackets beside the measured cP value. For a definition of the viscosity measured in centipoise (cP), see, for example, Bergmann, Schaefer, Lehrbuch der Experimentalphysik Volume 1, Mechanik, Akustik, Wärme, Walter de Gruyter, Berlin, New York, 1975, page 318.

The electrolyte resistance of the dispersions was determined as follows:

The given electrolyte solution (e.g. 10% NaCl solution) was slowly added drop-wise from a burette to 25 g of the latex which was contained in an Erlenmeyer flask and had been thoroughly mixed with a magnetic stirrer. Not more than 30 ml of the electrolyte solution are added in each case.

Coagulation sets in earlier or later according to the electrolyte compatibility of the given dispersion. The point at which coagulation sets in is in most cases clearly recognizable. The electrolyte resistance is measured by the number of ml at which coagulation sets in. The higher the number of ml, the higher is the electrolyte resistance.

The water resistance of the clear films was determined as follows:

Wet films 90μ in thickness were drawn out on degreased glass plates (treated with chromosulphuric acid followed by distilled water), using a doctor rule.

When 0.4 ml of water was placed in the form of a thick droplet on the surface of the clear film which had been formed after 60 minutes at room temperature (about 22° C.), this water test was described as "water resistance L" or briefly L.

When the same test was carried out on the air-dried film only after it had been treated in the drying cupboard (15 minutes at 120° C.) and then cooled to room temperature for 45 minutes, this test was described as "water resistance O" (oven) or briefly O.

Grading of the water resistance of the areas of clear film surface which had been tested with water was carried out immediately after application of the drop of water as follows:
(a) qualitatively visually according to the degree of cloudiness of the clear film (grades 1-4), and
(b) qualitatively mechanically by vigorously rubbing with the tip of the middle finger (grades A-D).

The grades have the following meaning:
1=pronounced development of white colour and heavy clouding
2=medium clouding
3=weak clouding
4=clear and unchanged from untreated film.
In addition:
A=dissolution of film when rubbed
B=substantial destruction of film when rubbed
C=softening
D=firm, tough surface, unchanged from untreated film.

Grade 4 D is therefore the best. The film has in this case remained clear in the part treated with water and cannot be destroyed by vigorous rubbing with the tip of the finger. A film of water resistance 1 A is very cloudy after the water treatment and can be destroyed by rubbing with the tip of the finger.

The molecular size is defined by the limiting value of the reduced specific viscosity for infinitely small polymer concentrations, the STAUDINGER INDEX or intrinsic viscosity number $[\eta]$, dl/g, the solvent used and the temperature at which the measurement was carried out (for further details see M. Hofmann, H. Krömer and R. Kuhn Polymeranalytik I, Thieme Taschenbuch der Organischen Chemie, Volume 4, Georg Thiene Verlag, Stuttgart, 1977).

The acrylonitrile present as residual monomer in the dispersions was determined as follows:

A drop (about 0.02 g) of n-butanol is added to 0.5 g of latex which is carefully weighed and then diluted with purest butyrolactone to a total volume of 7.5 ml. The mixture becomes clear after some time. It can be analysed by gas chromatography. Injection: 1 microliter (=0.001 cc); column: carbowax 6000 on Teflon, 2 meter glass; FID detector, temperature progress: 10 deg. Cent./min. from 70°-220° C. Injection block 250° C. Instrument: Packard, type 417.

The minimum film-forming temperature, MFT [°C.] was determined according to DIN 53 787. Wet films 90μ in thickness of the dispersion, which was usually at a concentration of about 45% were applied using doctor rule. Velocity of air current: 0.6 cm/sec; temperature of entering air: 0° C.

Latices are described as resistant to freezing if they show no signs of a coagulate after having been frozen once (cooling of the dispersion to about −10° C.) and then thawed.

2. Process According to the Invention

Examples (Reaction Mixtures A–G)

Various formulations for polymerization, A–G, are given in Table I. The sum of the parts by weight of the individual components to be put into the process was converted to 100 (=percent by weight) to facilitate comparison. The quantities used were in each case 32 times the parts by weight indicated in Table I.

Dispersion A was prepared as follows:

The following components are introduced into the 4 liter glass apparatus described under "1. Explanations":

| I | De-ionized water | 1,040.45 g |
|---|---|---|
|  | Emulsifier* | 3.94 g |

| II | n-butyl acrylate | 55.26 g |
|---|---|---|
|  | acrylonitrile | 52.96 g |
|  | methacrylic acid | 4.03 g |
|  | N-methoxymethyl-methacrylamide | 2.88 g |
|  | Interim monomer sum | 115.13 g |

The mixture is heated in a nitrogen atmosphere with stirring (250 revs. per min.) until a temperature of 60° C. is reached.

The following components are then added simultaneously from separate containers as "activators injections" within about 5 seconds:

| III | Potassium peroxodisulphate, $K_2S_2O_8$ | 1.73 g |
|---|---|---|
|  | dissolved in water | 52.35 g | and

| IV | sodium pyrosulphite, $Na_2S_2O_5$ | 0.576 g |
|---|---|---|
|  | dissolved in water | 52.35 g |

Polymerization sets in immediately after injection of the activator system. The initially cloudy emulsion of monomers and water is converted into a finely divided, almost monodisperse nuclear latex.

Components I–IV are initially introduced into the flask, and components V–VII are added subsequently Addition of the monomer mixture consisting of

| V | n-butyl acrylate | 616.13 g |
|---|---|---|
|  | acrylonitrile | 590.43 g |
|  | methacrylic acid | 44.93 g |
|  | N-methoxymethyl-methacrylamide | 32.10 g |
|  | Interim total | 1,238.59 g | and of the activator solution consisting of

| VI | water | 347.55 g |
|---|---|---|
|  | potassium peroxdisulphate, $K_2S_2O_8$ | 4.64 g |
|  | emulsifier* | 24.06 g | and of the pyrosulphite solution consisting of

| VII | water | 272.19 g |
|---|---|---|
|  | sodium pyrosulphite, $Na_2S_2O_5$ | 1.44 g | is begun when heat tone has decreased and is completed in the source of 6 hours (=6h)

A linear rate of addition is effected by means of suitable metering pumps.

When all the constituents have been added, the reaction mixture is stirred at 60° C. until the solids content of the dispersion is constant (about 2 hours).

3.2 kg of latex having a solids content of 44.8% by weight and containing only a very small amount of coagulate (see Table II) are obtained.

The latex has a latex particle diameter of about 145 nm and dries at an elevated temperature (MFT 28° C.) to form glossy, clear, hard and tack-free films of great strength. Coalescence and cross-linking of the latex particles is facilitated by after-heating (20 minutes at 130° C.).

The total quantity of water, monomers, emulsifier and initiator, $P_{H2O\ total} + P_{Mon.\ total} + P_{E.\ total} + P_{I.\ total} = 100\%$ by weight is composed as follows, using the terms explained earlier:

$$P_{H2O\ total} = P_{H2O\ E.v.} + P_{H2O\ Ox.v.} + P_{H2O\ Red.v.} +$$

$$P_{H2O\ v.\ total}$$
$$P_{H2O\ E.n.} + P_{H2O\ Ox.n.} + P_{H2O\ Red.n.}$$

$$P_{H2O\ n.Total}$$
$$= 32.514 + 1.636 + 1.636 + 10.861 + 8.506 = 55.153$$

$$P_{H2O\ v.\ total} \qquad P_{H2O\ n.total}$$
$$P_{Mon.total} = P_{Mon.v.} + P_{Mon.n.}$$
$$= 1.727 + 1.655 + 0.126 + 0.09 +$$

$$P_{Mon.v.}$$
$$19.254 + 18.451 + 1.404 + 1.003$$

$$P_{Mon.n}$$
$$= 3.598 + 40.112 = 43.710$$
$$P_{E.total} = P_{E.v.} + P_{E.n.}$$
$$= 0.123 + 0.752 = 0.875$$
$$P_{I.total} = P_{I.v.} + P_{I.n.} = P_{Ox.v.} + P_{Red.v.} + P_{Ox.n.} + P_{Red.n.}$$

$$= 0.054 + 0.018 + 0.145 + 0.045 = 0.262$$

The other parameters are calculated as follows:

$$k_{Mon.} = \frac{P_{Mon.v.}}{P_{Mon.v.} + P_{HOH\ v.\ total}} \times 100$$

$$= \frac{3.598 \times 100}{3.598 + 35.786} = \frac{359.8}{39.384} = 9.13$$

$$[E^*]_v = \frac{P_{E.v} \times 1000}{P_{H2O\ v.\ total}} = \frac{0.123 \times 1000}{35.786} = 3.44$$

$$[I]_v = \frac{P_{I.v.} \times 1000}{P_{H2O\ v.\ total}} = \frac{(P_{Ox.v.} + P_{Red.v.}) \times 1000}{P_{H2O\ v.\ total}}$$

$$= \frac{(0.054 + 0.018) \times 1000}{35.786} = 2.01$$

$$k_I = \frac{P_{Red.v.} + P_{Red.\ n.}}{P_{Ox.v.} + P_{Ox.n.}}$$

$$= \frac{0.018 + 0.045}{0.054 + 0.145} = \frac{0.063}{0.199} = 0.316$$

$$V_{Mon.} = \frac{P_{Mon.v.}}{P_{Mon.\ total}} \times 100$$

$$= \frac{3.598 \times 100}{43.710} = 8.23$$

The parameters for the reaction mixture A according to the invention are summarized in the continuation of Table I. The parameters for experiments B–G according to the invention, which are also shown in the continuation of Table I, are calculated analogously.

Dispersions B to G entered in Table II are prepared by a method analogous to experiment A.

The composition of the monomer mixtures varies from one reaction mixture to another within the limits of the invention (see Table I). As shown in Table II, dispersions A–G vary characteristically in their minimum film-forming temperature MFT (°C.) determined according to DIN 53 787, which is the temperature above which the given dispersion dried to form clear films. The MFT falls as the proportion of n-butyl acrylate increases. The hardness of the films formed from dispersions A–G decreases in parallel with the MFT.

The pendulum hardness according to König (DIN 53 157) was used as a measure of the hardness.

The Shore hardness of the products, their tensile strength and elongation in dependence upon the measuring temperature will be discussed elsewhere.

The dispersions have particle sizes (latex particle diameters) of about 110–145 nm. The distribution of the latex particle diameters is very narrow, as confirmed by electron microscopic investigations.

Whereas dispersions adjusted to pH=7 (t=22° C.) hardly differ from each other in their outflow time in the outflow cup according to DIN 53 211 (4 mm nozzle), a marked differentiation in the flow characteristics occurs on further addition of aqueous ammonia (solution of $NH_3$ in water, 10% by weight).

At pH=8.5, dispersions A–D are distinctly thickened but still flow through the 4 mm nozzle of the outflow cup whereas dispersions E, F and G are more highly viscous and can flow only through the 6 or 8 mm nozzle.

Dispersions A–G are stable to shearing when made alkaline (pH=8–8.5). They can be treated with a high speed stirrer (Klaxon stirrer, type HM 5 UB of Klaxon Ltd., Warwick Road, Birmingham) at 14,000 revs. per min., diameter 20 mm, 20 mm, 20 min, without forming a coagulate.

Furthermore, they can be frozen at pH values starting from 7 and form no coagulate when thawed.

An addition of a 10% sodium chloride or a 2.5% $CaCl_2$ solution in a proportion by volume of 1 part of dispersion to 1 part of electrolyte solution to dispersions adjusted to pH=8 causes no coagulate formation either immediately or after the dispersion has been left to stand overnight, and thus proves that the dispersion has a high stability to electrolytes.

For the use of these dispersions as binders for paints, see the part of this application dealing with the technical application of the products.

TABLE I

| Components used in parts by weight | | A | B | C | D | E | F | G |
|---|---|---|---|---|---|---|---|---|
| I | Deionized water | 32.514 | 33.200 | 33.159 | 33.202 | 31.865 | 33.209 | 33.143 |
| | Emulsifier (100% WAS) | 0.123 | 0.156 | 0.133 | 0.218 | 0.153 | 0.218 | 0.133 |
| | n-butyl acrylate | 1.727 | 2.067 | 2.233 | 2.294 | 4.013 | 2.482 | 2.413 |
| | acrylonitrile | 1.655 | 1.439 | 1.184 | 1.218 | 1.292 | 0.936 | 0.914 |
| | styrene | 0.0 | 0.0 | 0.0 | 0.0 | 1.292 | 0.0 | 0.0 |
| II | methacrylic acid | 0.126 | 0.073 | 0.146 | 0.146 | 0.275 | 0.146 | 0.146 |
| | acrylic acid | 0.0 | 0.073 | 0.0 | 0.0 | 0.0 | 0.0 | 0.0 |
| | N-methoxymethyl-methacrylamide | 0.090 | 0.0 | 0.091 | 0.0 | 0.0 | 0.091 | 0.183 |
| III | deionized water | 1.636 | 1.646 | 1.646 | 1.646 | 1.646 | 1.646 | 1.646 |
| | purest $K_2S_2O_8$ | 0.054 | 0.054 | 0.054 | 0.054 | 0.054 | 0.054 | 0.054 |
| IV | deionized water | 1.636 | 1.646 | 1.646 | 1.646 | 1.646 | 1.646 | 1.646 |
| | $Na_2S_2O_5$ | 0.018 | 0.018 | 0.018 | 0.018 | 0.018 | 0.018 | 0.018 |
| | n-butyl acrylate | 19.254 | 23.076 | 24.896 | 25.543 | 22.732 | 27.658 | 26.904 |
| | acrylonitrile | 18.451 | 16.064 | 13.202 | 13.565 | 7.318 | 10.428 | 10.191 |
| | styrene | 0.0 | 0.0 | 0.0 | 0.0 | 7.318 | 0.0 | 0.0 |
| V | methacrylic acid | 1.404 | 0.815 | 1.629 | 1.629 | 1.557 | 1.629 | 1.631 |
| | acrylic acid | 0.0 | 0.815 | 0.0 | 0.0 | 0.0 | 0.0 | 0.0 |
| | N-methoxymethyl-methacrylamide | 1.003 | 0.0 | 1.019 | 0.0 | 0.0 | 1.018 | 2.038 |
| VI | deionized water | 10.861 | 9.637 | 9.723 | 9.637 | 9.637 | 9.637 | 9.722 |
| | purest $K_2S_2O_8$ | 0.145 | 0.178 | 0.178 | 0.178 | 0.178 | 0.178 | 0.178 |
| | emulsifier (100% WAS) | 0.752 | 0.757 | 0.757 | 0.720 | 0.720 | 0.720 | 0.757 |
| VII | deionized water | 8.506 | 8.227 | 8.227 | 8.227 | 8.227 | 8.227 | 8.224 |
| | $Na_2S_2O_5$ | 0.045 | 0.059 | 0.059 | 0.059 | 0.059 | 0.059 | 0.059 |
| Sum of all components | | 100 | 100 | 100 | 100 | 100 | 100 | 100 |
| Addition time (h) V,VI,VII: | | 6 | 5 | 5 | 5 | 6 | 5 | 5 |
| Polymerization temperature °C. | | 60 | 50 | 50 | 55 | 60 | 60 | 50 |
| $P_{H2O\ total}$ see Claim 1, Ia | | 55.153 | 54.356 | 54.401 | 54.358 | 53.021 | 54.365 | 54.381 |
| $P_{Mon\ total}$ see Claim 1, Ib | | 43.710 | 44.422 | 44.400 | 44.395 | 45.797 | 44.388 | 44.420 |
| $P_{E.\ total}$ see Claim 1, Ic | | 0.875 | 0.913 | 0.890 | 0.938 | 0.873 | 0.938 | 0.890 |
| $P_{I.\ total}$ see Claim 1, Id | | 0.262 | 0.309 | 0.309 | 0.309 | 0.309 | 0.309 | 0.309 |

TABLE I-continued

| Components used in parts by weight | Reaction Mixtures | | | | | | |
|---|---|---|---|---|---|---|---|
| | A | B | C | D | E | F | G |
| $k_{Mon.}$; see Claim 1, IIa | 9.13 | 9.13 | 9.11 | 9.50 | 17.02 | 9.10 | 9.10 |
| $[E^*]_v$; see Claim 1, IIb | 3.44 | 4.27 | 3.65 | 6.26 | 4.57 | 5.97 | 3.65 |
| $[I]_v$; see Claim 1, IIc | 2.01 | 1.97 | 1.97 | 2.06 | 2.15 | 1.97 | 1.98 |
| $k_I$; see Claim 1, IId | 0.32 | 0.32 | 0.32 | 0.32 | 0.32 | 0.32 | 0.32 |
| $v_{Mon.}$; see Claim 1, IIe | 8.23 | 6.72 | 8.23 | 8.23 | 15.0 | 8.23 | 8.23 |

TABLE II

| Dispersion: | A | B | C | D | E | F | G |
|---|---|---|---|---|---|---|---|
| polymer composition %: | | | | | | | |
| n-butyl acrylate | 48.0 | 56.6 | 61.1 | 62.7 | 58.4 | 67.9 | 66.0 |
| acrylonitrile | 46.0 | 39.4 | 32.4 | 33.3 | 18.8 | 25.6 | 25.0 |
| styrene | — | — | — | — | 18.8 | — | — |
| methacrylic acid | 3.5 | 2.0 | 4.0 | 4.0 | 4.0 | 4.0 | 4.0 |
| acrylic acid | — | 2.0 | — | — | — | — | — |
| N-methoxymethyl-methacrylamide | 2.5 | — | 2.5 | — | — | 2.5 | 5.0 |
| Solids content crude latex % : | 44.8 | 45.3 | 45.2 | 45.4 | 46.7 | 45.4 | 45.4 |
| Yield of latex about 3200 g | | | | | | | |
| Residual acrylonitrile monomer in crude latex % (n.GC) | 0.1 | 0.07 | 0.2 | 0.09 | 0.08 | 0.07 | 0.2 |
| Coagulate in g after filtration through 60 μ cloth, dried 30 min. at 180-200° C. | 2.9 | 0.3 | 0.6 | 2.8 | 1.5 | 1.0 | 1.2 |
| Particle size according to light scattering (nm) | 147 | 130 | 138 | 115 | 125 | 104 | 117 |
| Minimum film forming temperature according to DIN 53 787 (°C.) | 28 | 19 | 15 | 10 | 15 | 3 | 8 |
| Pendulum hardness of clear films (75 μ thickness) according to Konig: see DIN 53 157 (sec) | 145 | 110 | 75 | 35 | 42 | 20 | 35 |
| PH of crude latex | 5.5 | 4.2 | 4.8 | 5.0 | 4.8 | 4.8 | 5.1 |
| Outflow time in sec. according to DIN 53 211 after adjustment to pH 7 | 14 | 14 | 15 | 14 | 15 | 15 | 15 |
| pH 7.5 | | | | 16 | | 17 | |
| pH 8.0 | 17 | 22 | | 18 | | 21 | 22 |
| pH 8.5 | 25 | 40 | 37 | 27 | 20* | 17* | 13** |
| Water resistance 0 | | | | | | | |
| Film of latex at pH = | 5.5 | 4.2 | 4.8 | 5.0 | 4.8 | 4.8 | 5.1 |
| Grade = | 4 C | 4 C | 4 C | 4 C | 4 C | 4 B | 4 B |
| Film of latex at pH = | 8.0 | 8.0 | 8.0 | 8.0 | 8.0 | 8.0 | 8.0 |
| Grade = | 4 D | 4 D | 4 D | 4 D | 4 D | 4 C | 4 C |
| Electrolyte stability: 25 g latex at pH of crude latex + 10% aqueous NaCl solution coagulates after ml | 8 | 6 | 8 | 5 | 6 | 7 | 8 |
| + 10% aqueous CaCl$_2$ solution coagulates after ml | 3 | 2 | 3 | 2 | 3 | 2 | 3 |
| 25 g latex at pH = 8 + 10% aqueous NaCl solution coagulates after ml | 30 | 30 | 30 | 30 | 30 | 30 | 30 |
| + 10% aqueous CaCl$_2$ solution coagulates after ml | 10 | 9 | 9.5 | 8 | 10 | 9 | 10 |

*6mm φ nozzle
**8mm φ nozzle
otherwise: 4mm φ nozzle

2. Comparison Experiment I

Example IV of U.S. Pat. No. 2,787,603 was repeated exactly according to the procedure indicated in Example I of the said U.S. patent except that the starting materials were used in about 8.6 times the quantities indicated there.

Polymerization was carried out under nitrogen, and the water in the polymerization apparatus was boiled in the stream of nitrogen.

The emulsifier (sodium lauryl sulphate) was added to the boiled water at 65.6° C. (=150° F.). Sodium pyrosulphite was then added, followed by the monomer mixture. The potassium persulphate was finally added as an aqueous (saturated) solution.

The aqueous polymerization mixture was maintained at 60° C. (140° F.) for 2 hours until polymerization was completed.

The hot dispersion was freed from residual monomer by blowing air through it (for about 1 hour at 80° C.).

| | |
|---|---|
| Solids content of dispersion: | 33%; pH 3.8 |
| Quantity of coagulate: | 3.4 g |
| Latex particle diameter: | 96 nm |
| Residual monomer ACN according to gas chromatographic analysis before degassing: | 0.26% |
| Residual monomer ACN according to gas chromatographic analysis after degassing: | 0.079% |

When an approximately 10% ammoniacal water is added to this dispersion with stirring, the dispersion begins to thicken at pH 7.5 and finally acquires a tough, pasty consistency (pH 8.5). This property is just as undesirable for the uses envisaged in the present application as the low solids content of the dispersion, which is only 33%.

For tests of this dispersion to assess its practical usefulness, see the part dealing with the practical application.

We shall now study the parameters of the process according to the Examples of the U.S. patent on the basis of the data given in the said Patent and compare them with the parameters of the process according to the invention.

| Parameters according to Examples IV and I of U.S. Pat. No. 2,787,603 | according to the process of the invention |
|---|---|
| 1. $p_{H2O\ total}$ 66.467% by weight (= $p_{H2O\ v.\ total}$ since this is a reaction batch) | 48.4–59.7% by weight |
| 2. $p_{Mon.total}$ 33.234% | 40.0–50.0% by weight |
| 3. $p_{E.\ total}$ 0.166% | 0.25–2.0% by weight |
| 4. $p_{I.\ total}$ 0.133% | 0.025–0.4% by weight |
| Sum of components 1 to 4 = 100% | |
| % by weight n-butyl acrylate: 65 } used | 47.5–70.5 |
| % by weight acrylonitrile: 35 } | 20.0–48.0 |
| % by weight methacrylic acid: 5 } | 3.5–4.5 |
| $k_{Mon.}$ = 33.3 | 5–20 |
| $\frac{(9.97 + 21.602 + 1.662) \times 100}{(9.97 + 21.602 + 1.662 + 66.467)} = 33.33$ | |
| $[E]_v$ = 2.5 | 2–40 |
| $\frac{0.166 \times 1000}{66.467} = 2.497$ | |
| $[I]_v$ = 2.0 | 0.5–4.0 |
| $\frac{(0.033 + 0.10) \times 1000}{66.467} = 2.001$ | |
| $k_I$ = 0.33 | 0.0–4.0 |
| $\frac{0.033}{0.100} = 0.33$ | |
| $v_{Mon.}$ = 100 | 6–15 |
| $\frac{33.234}{33.234} \times 100 = 100$ | |

It follows that the $p_{H2O\ total}$, $p_{Mon.total}$, $p_{E.total}$, $k_{Mon}$, $v_{Mon}$, methacrylic acid content and nature of the emulsifier in the process according to U.S. Pat. No. 2,787,603 lie outside the range claimed in the present application.

In Table III, column I lists all the components in percent by weight which are used in the polymerization process according to Example IV of U.S. Pat. No. 2,787,603. Column I A gives the same components in grams, sodium lauryl sulphate being used as emulsifier. Column I B is similar to Column I A but instead of sodium lauryl sulphate, an emulsifier according to the invention as indicated under 1. Explanations is used. Table III, continuation 1, gives the polymerization parameters and Table III, continuation 2, gives the properties of the dispersions prepared according to Example IV of the U.S. patent using sodium lauryl sulphate (Column I A) and the emulsifier used according to the invention (Column I B).

It will be seen that the latices obtained by the process according to Example IV of the U.S. patent have relatively low solids contents (about 33%). The coagulate content is low. When aqueous 10% NH₃ is added, the latices undergo very substantial thickening and at pH 8.5 they can no longer flow freely but become highly viscous pastes from which no films can be drawn.

Although films can be drawn from the crude latices which have a pH of about 3.4–4, these films are inferior in their water resistance 0 to films obtained from the dispersions according to the invention, and furthermore they are not resistant to freezing. No advantages can be obtained even by using the emulsifier according to the invention in Example 4 of the U.S. patent.

2. Comparison Experiment II

Example IV of U.S. Pat. No. 2,787,603 (=Comparison experiment I) is now modified so that the parameters, $p_{H2O\ total}$ and $p_{Mon.total}$ fall within the conditions of claim 1 of the present application. $p_{H2O\ total}$ is adjusted to 55 and $p_{Mon.total}$ to 44.6. Summarizing, the parameters have the following values:

| Examples IV and I of U.S. Pat. No. 2,787,603 | Invention |
|---|---|
| $p_{H2O\ total}$ = 55.0 in % by weight | 48.4–59.7% by weight |
| $p_{Mon.total}$ = 44.597 in % by weight | 40.0–50.0% by weight |
| $p_{E.\ total}$ = 0.233 in % by weight | 0.25–2.0% by weight |
| $p_{I.\ total}$ = 0.179 in % by weight | 0.025–0.4% by weight |
| $k_{Mon.}$ = 44.78 | 5–20 |
| $[E]_v$ = 4.054 | 2–40 |
| $[I]_v$ = 3.254 | 0.5–4.0 |
| $k_I$ = 0.33 | 0–4 |
| $v_{Mon.}$ = 100 | 2–15 |

It will be seen that now only the parameters $p_{E.total}$, $k_{Mon.}$ and $v_{Mon.}$ lie outside the scope of the claim of the present invention. In Comparison Experiment II C, sodium lauryl sulphate is used as emulsifier. Comparison Experiment II D differs from Comparison Experiment II C only in that it uses an emulsifier according to the invention instead of sodium lauryl sulphate.

In Table III, all the components used in Comparison Experiments II C and II D are listed in % by weight in column II. Column II C contains the components of Comparison Experiment II C and Collumn II D contains the components of Comparison Experiment II D in grams. In Table III, continuation 1, the polymerization parameters of the comparison experiments are listed under the corresponding columns II C and II D. Table III, continuation 2, shows the properties of the latices or films obtained from Comparison Experiments II C and II D.

Polymerization is carried out in the same manner as in Comparison Experiment I.

The latices obtained in the course of a highly exothermic reaction in which the temperature can nevertheless be kept constant by means of an electronic temperature control are sensitive to shearing forces and, where sodium lauryl sulphate is used an emulsifier, they also contain large quantities of coagulate.

Dispersions II C and II D have substantially the same disadvantages as the dispersions obtained from Comparison Experiments I A and I B. Although the use of emulsifier according to the invention in comparison example II C reduces the amount of coagulate formed, increases the solids content and slightly improves the resistance to electrolytes and pigment, the dispersions undergo even more thickening on the addition of 10% aqueous $NH_3$ than the dispersions from Comparison Experiment I A and I B.

TABLE III

| Line | Components, parameters Comparison Experiment | I % by weight | IA g | IB g | II % by weight | II C g | II D g |
|---|---|---|---|---|---|---|---|
| 1 | Deionized water, $O_2$ free | 66.467 | 1728.14 | 1728.14 | 55.001 | 1430.03 | 1430.03 |
| 2 | $Na_2S_2O_5$, Sodium pyrosulphite | 0.033 | 0.86 | 0.86 | 0.045 | 1.17 | 1.17 |
| 3 | Sodium lauryl sulphate | see line 9 | 4.32 | — | see line 9 | 5.80 | — |
| 4 | Emulsifier* (according to the present invention) | " | — | 4.32 | see line 9 | — | 5.30 |
| 5 | acrylonitrile | 9.970 | 259.22 | 259.22 | 13.379 | 347.85 | 347.85 |
| 6 | n-butyl acrylate | 21.602 | 561.65 | 561.65 | 28.988 | 753.69 | 753.69 |
| 7 | methacrylic acid | 1.662 | 43.21 | 43.21 | 2.230 | 57.98 | 57.98 |
| 8 | $K_2S_2O_8$ potassium peroxidisulphate | 0.100 | 2.6 | 2.6 | 0.134 | 3.48 | 3.48 |
| 9 | % by weight emulsifier Na lauryl sulphate or emulsifier* | 0.166 | — | — | 0.233 | — | — |
| 10 | total | 100 | 2600 | 2600 | 100 | ~2600 | ~2600 |
| 11 | | | | | | | |
| 12 | Polymerization temperature (latex) °C. | | 60 | 60 | | 60 | 60 |
| 13 | Polymerization time (h) | | 2 | 2 | | 2 | 2 |

| | | I A | I B | II C | II D |
|---|---|---|---|---|---|
| | % acrylonitrile units in the copolymer | 30 | 30 | 30 | 30 |
| | % n-butyl acrylate units in the copolymer | 65 | 65 | 65 | 65 |
| | % methacrylic acid units in the copolymer | 5 | 5 | 5 | 5 |
| | $p_{H2O\ total}$ see Claim 1, Ia | 66.467 | 66.467 | 55.00 | 55.00 |
| | $p_{Mon.\ total}$ see Claim 1 Ib | 33.234 | 33.234 | 44.597 | 44.597 |
| | $p_{E.\ total}$ see Claim 1, Ic | 0.166 | 0.166 | 0.223 | 0.223 |
| | $p_{I.\ total}$ see Claim 1, Id | 0.133 | 0.133 | 0.179 | 0.179 |
| | $k_{Mon.}$; see Claim 1, IIa | 33.3 | 33.3 | 44.78 | 44.78 |
| | $[E]_v$, 1 see Claim 1, IIb | 2.5 | 2.5 | 4.054 | 4.054 |
| | $[I]_v$; see Claim 1, IIc | 2.0 | 2.0 | 3.254 | 3.254 |
| | $k_I$; see Claim 1, IId | 0.33 | 0.33 | 0.33 | 0.33 |
| | $v_{Mon}$; see Claim 1, IIe | 100 | 100 | 100 | 100 |
| | Solids content crude latex %/pH | 33/3.8 | 32.7/3.8 | Ca40/3.8 | 43.5/3.9 |
| | Latex yield in g | ca.2590 | ca.2580 | ca.2100 | ca.2450 |
| | Coagulate in g after filtration through 60 μ cloth, dried 30 min. at 180-200° C. | 3.4 | 8.0 | ca. 250 | 71 |
| | Residual monomer ACN, crude latex, % according to GC | 0.26 | 0.25 | 0.56 | 0.29 |
| | Outflow time of latex at pH 8.5 according to DIN 53 211, 4 mm φ, 6 mm φ and 8 mm φ nozzle | not measurable | not measurable | not measurable | not measurable |
| | Electrolyte stability: 25 g crude latex, pH + 10% aqueous NaCl solution, coagulated after addition of ml | 3.8 2 | 3.8 5 | 3.8 2 | 3.9 5 |
| | + 10% aqueous $CaCl_2$ solution, coagulated after addition of ml | 0.5 | 0.5 | 0.5 | 2 |
| | Water resistance 0, grade | 4 B | 4 B | 4 B | 4 B |
| | Film from latex at pH = | 3.4 | 3.9 | 3.8 | 3.9 |
| | Particle size of latex end product in nm from light scattering | 96 | 100 | 161 | 155 |
| | Resistance to freezing pH/+ or − − = not resistant to freezing | 3.8/− | 3.9/− | 3.8/− | 3.9/− |

2. Comparison Experiment III

The previous Comparison Experiments demonstrate that neither according to the teaching of U.S. Pat. No. 2,787,603 (Examples IV and I of U.S. Pat. = Comparison Experiment I A) nor according to Comparison Experiments I B, II C and II D in which Examples IV + I of the U.S. Pat. have been modified in accordance with the teaching of the present application by adapting some but not all of the polymerization parameters to the polymerization parameters claimed in the present invention, is it possible to obtain latices which have a solids content above 40% by weight and at the same time a low coagulate content, a high resistance to electrolytes and particular particle diameters and which thicken after the addition of a 10 to 25% aqueous $NH_3$ but remain capable of being cast so that water-resistant, glossy films can be obtained from them after drying.

Comparison Experiments I B and II D also demonstrate that the replacement of sodium lauryl sulphate as emulsifier by the emulsifier according to the invention affords little or no advantages if only some of the other polymerization parameters accord with those of the present invention.

In the following Comparison Experiments, additional polymerization parameters were brought into line step by step with those claimed according to the invention, i.e. parameter $p_{E. total}$ in Comparison Experiment III A, in addition parameter $k_{Mon.}$ in III B, in addition parameter $v_{Mon.}$ in III C (but parameter $[I]_v$. is again outside the limits of the invention), while in III D all the polymerization parameters lie within the limits according to the invention with the exception of the nature of the emulsifier (sodium lauryl sulphate instead of the emulsifier according to the invention) and the quantity of methacrylic acid incorporated (5% instead of 2.5–4.5%). In Comparison Experiment III E, Comparison Experiment III D has been modified so that the methacrylic acid content still lies outside the limits according to the present invention but the emulsifier according to the invention is used. Comparison Experiment F is an example according to the present invention since in contrast to Comparison Experiment III E, the proportion of methacrylic acid incorporated (4%) also lies within the limits claimed.

To give a clear overall picture, the most important polymerization parameters are summarized and compared below:

| Comparison | IIIA | IIIB | IIIC | IIID | IIIE | Parameters according to the invention |
|---|---|---|---|---|---|---|
| Methacrylic acid % | 5 | 5 | 5 | 5 | 5 | 3.5–4.5 |
| $p_{H2O}$ total | 54.57 | 54.57 | 54.57 | 54.57 | 54.57 | 48.4–59.7 |
| $p_{Mon.}$ total | 45 | 45 | 45 | 45 | 45 | 40–50 |
| $p_E$. total | 0.25 | 0.25 | 0.25 | 0.25 | 0.25 | 0.25–2 |
| $p_I$. total | 0.18 | 0.18 | 0.18 | 0.18 | 0.18 | 0.025–0.4 |
| $k_{Mon.}$ | 45.2 | 10 | 10 | 10 | 10 | 5–20 |
| $[E]_v$. | 4.58 | 4.58 | 4.57 | 2.5 | 2.5 | 2–40 |
| $[I]_v$. | 3.3 | 3.3 | 5.2 | 1.2 | 1.2 | 0.5–4.0 |
| $k_I$. | 0.3 | 0.3 | 0.3 | 0.3 | 0.3 | 0–4 |
| $v_{.Mon.}$ | 100 | 13.5 | 8.5 | 8.5 | 8.5 | 2–12 |
| Sodium lauryl sulphate | x | x | x | x | | |
| Emulsifier according to the invention | | | | | x | x |

Comparison Experiment F = Example according to the invention corresponds to Comparison Example III E with 4% by weight of methacrylic acid incorporated.

In Comparison Experiment III A, water, sodium lauryl sulphate, sodium pyrosulphite and the whole monomer mixture are introduced into the reaction vessel (I, Batch process) and polymerization is started by the addition of the persulphate solution II when the batch has been heated to 60° C. In all the batch processes $v_{Mon.} = 100$.

In all the Comparison Experiments, polymerization is carried out in the 4-liter glass apparatus described under 1. Explanations. 30 times the quantities are given in percent by weight in Table IV are used in each case. The sum of percentages by weight of components I to VI indicated in Table IV is 100.

In Comparison III A, polymerization starts immediately after the persulphate injection II. To maintain the reaction temperature in the flask (measured in the latex), the electronic control adjusts the temperature of the highly insulated external bath in dependence upon the time by cold water injections as follows:

| Time (Min.) | Reaction Temperature °C. | External bath temperature °C. |
|---|---|---|
| 0 | 60.0 | 62 (persulphate injection) |
| 10 | 60.1 | 52 |
| 20 | 60.2 | 48 |
| 30 | 60.0 | 43 |
| 40 | 60.0 | 47 |
| 50 | 60.0 | 49 |
| 60 | 60.0 | 52 |
| 70 | 60.0 | 56 |
| 80 | 60.0 | 58 |
| 90 | 60.0 | 60 |

After about 90 minutes, the experiment has to be stopped owing to the formation of lumps and coagulate on the stirrer blades and thermometer sleeve. The vigorous evolution of heat and the formation of coagulate indicate that such batches are unsuitable for use on a large technical scale. Further details may be seen from Tables IV and IV/Continuation 1 to 3.

Starting from Comparison Experiment III B, the batch process is no longer used. In comparison III B, only part of the monomer mixture (see Table IV) is initially introduced into the reaction vessel and the remainder of the monomer mixture, IV, is added in the course of 2 hours after initiation of polymerization with persulphate solution II, while the reaction temperature is maintained at 60° C. In this method, the temperature control establishes a virtually constant difference between reaction temperature and bath temperature, amounting to about 4° C.

No more evolution of heat can be detected 80 minutes after the addition of IV has been completed.

In Comparison Experiment III C (see Table IV), even less water and emulsifier and monomer mixture is initially introduced into the reaction vessel but the monomer/water ratio, $k_{Mon.}$ and the emulsifier concentration $[E]_v$. in this aqueous reaction medium are kept the same.

Addition of the main portion of monomers IV is begun after polymerization has been initiated with the persulphate solution II and simultaneously with the addition of emulsifier solution V and is continued over 5 hours.

The reaction mixture is then stirred for a further 3 hours at 60° C. to complete the conversion of the monomers. This procedure is also suitable for application on a large scale (e.g. 10,000 liter stirrer vessel).

In comparison Experiment III D (see Table IV), using otherwise the same conditions as in Comparison Experiment III C, the concentration of emulsifier and the concentration of initiator in the reaction medium are reduced and the remaining quantity of emulsifier and initiator is added in the course of 5 hours, together with monomer mixture IV, and polymerization is then continued for 3 hours at 60° C.

Comparison Experiment III E and Comparison Experiment F (Example according to the invention) are carried out in the same manner as Comparison Experiment III D.

In Table IV, the components used are given in percent by weight (total=100). 30 times the quantities by weight are used. In Table IV/Continuation 1, the monomer units in the copolymer in percent by weight and other polymerization parameters of the various comparison experiments are set against each other for comparison, and Table IV/Continuation 2 shows the properties of the dispersions and of the films of the dispersions obtained in Comparison Examples III A to III E and F.

Table IV/Continuations 3 and 4 give a summary of the flow characteristics of the dispersions at pH values above 7. The viscosities are indicated in terms of cP at given solids contents of the dispersion.

Results

Comparison Experiment III A shows that the process (Batch process; $v_{Mon.}=100$) according to U.S. Pat. No. 2,787,603 cannot be used for the preparation of the dispersions on a large technical scale owing to the excessive evolution of heat and relatively high coagulate formation even when other parameters lie within the ranges defined according to the present invention.

In addition, the dispersion thickens to such an extent in the alkaline range that no films can be formed from it.

Although the dispersions obtained in Comparison Experiments III B, III C and III D, in which the polymerization components are partly introduced into the reaction vessel at the start and partly added subsequently in portions, have more advantageous flow characteristics than product III A after adjustment to pH values above 7 (using 10-25% NH$_3$) as well as producing less coagulate, they do not have sufficient stability to electrolytes.

Comparison Experiment III E, in which all the polymerization parameters except for the methacrylic acid content lie within the ranges defined according to the invention, demonstrates a slightly inferior flow of the dispersion at pH 8 to 8.5 but a considerable improvement in the electrolyte stability due to replacement of sodium lauryl sulphate as emulsifier by the emulsifier according to the invention.

Comparison Experiment F (example according to the invention) in which the proportion of methacrylic acid incorporated has been reduced to 4% shows the surprising finding that the flow of the dispersion in the alkaline region is substantially improved without any worsening in the electrolyte stability. The water resistance O of the film obtained from latex III F which has been adjusted to pH 8.5 is excellent.

The intrinsic viscosities [$\eta$] of the copolymers obtained in the dispersions are indicated below. They were determined in dimethyl formamide at 25° C.

| Copolymer of | IIIA | IIIB | IIIC | IIID | IIIE | IIIF |
|---|---|---|---|---|---|---|
| [$\eta$] dl/g | 7.0 | 7.4 | 5.4 | 5.8 | 5.6 | 5.4 |

TABLE IV

| Comparison Experiment | | IIIA | IIIB | IIIC | IIID | IIIE | IIIF |
|---|---|---|---|---|---|---|---|
| I | Deionized water | 50.000 | 50.00 | 28.60 | 28.61 | 28.61 | 28.61 |
| | Sodium lauryl sulphate or emulsifier* according to the invention | 0.250 | 0.250 | 0.158 | 0.086 | 0.086* | 0.086* |
| | Sodium pyrosulphite | 0.045 | 0.045 | 0.045 | — | — | — |
| | n-butyl acrylate | 29.250 | 3.94 | 2.50 | 2.50 | 2.50 | 2.524 |
| | Acrylonitrile | 13.50 | 1.82 | 1.15 | 1.15 | 1.15 | 1.161 |
| | Methacrylic acid | 2.25 | 0.3 | 0.19 | 0.19 | 0.19 | 0.154 |
| II | Potassium persulphate | 0.135 | 0.135 | 0.135 | 0.031 | 0.031 | 0.031 |
| | Deionized water | 4.570 | 4.570 | 5.99 | 2.99 | 2.99 | 2.99 |
| III | Sodium pyrosulphite | — | — | — | 0.01 | 0.01 | 0.01 |
| | Deionized water | — | — | — | 2.99 | 2.99 | 2.99 |
| IV | n-butyl acrylate | — | 25.31 | 26.75 | 26.75 | 26.75 | 27.03 |
| | Acrylonitrile | — | 11.68 | 12.34 | 12.34 | 12.34 | 12.47 |
| | Methacrylic acid | — | 1.95 | 2.05 | 2.05 | 2.05 | 1.64 |
| V | Deionized water | — | — | 20.0 | 10.0 | 10.0 | 10.0 |
| | Sodium pyrosulphite | — | — | — | 0.035 | 0.035 | 0.035 |
| | Sodium lauryl sulphate or emulsifier* according to the invention | — | — | 0.092 | 0.164 | 0.164* | 0.164* |
| VI | Water | — | — | — | 10.0 | 10.0 | 10.0 |
| | Potassium persulphate | — | — | — | 0.104 | 0.104 | 0.104 |

TABLE IV

Continuation 1

| Comparison Experiment | IIIA | IIIB | IIIC | IIID | IIIE | IIIF |
|---|---|---|---|---|---|---|
| ACN units | 30 | 30 | 30 | 30 | 30 | 30.32 |
| AB units | 65 | 65 | 65 | 65 | 65 | 65.78 |
| MAS units | 5 | 5 | 5 | 5 | 5 | 4 |
| $p_{H_2O}$ total percent by weight | 54.57 | 54.57 | 54.57 | 54.57 | 54.57 | 54.57 |
| $p_{Mon.}$ total percent by weight | 45 | 45 | 45 | 45 | 45 | 45 |
| $p_E$ total percent by weight | 0.25 | 0.25 | 0.25 | 0.25 | 0.25 | 0.25 |
| $p_I$ total percent by weight | 0.18 | 0.18 | 0.18 | 0.18 | 0.18 | 0.18 |
| $k_{Mon.}$ | 45.2 | 10 | 10 | 10 | 10 | 10 |
| $[E]_v$ | 4.58 | 4.58 | 4.57 | 2.5 | 2.5 | 2.5 |
| $[I]_v$ | 3.3 | 3.3 | 5.2 | 1.2 | 1.2 | 1.2 |
| $k_I$ | 0.3 | 0.3 | 0.3 | 0.3 | 0.3 | 0.3 |
| $v_{Mon.}$ | 100 | 13.5 | 8.5 | 8.5 | 8.5 | 8.5 |

TABLE IV
Continuation 2

| Comparison Experiment | IIIA | IIIB | IIIC | IIID | IIIE | F |
|---|---|---|---|---|---|---|
| Solids content crude latex %/pH | 44.3/4.25 | 44.5/4.3 | 44.2/4.5 | 44.3/4.5 | 44.1/4.3 | 44.2/4.3 |
| Coagulate (g) dried 30 min. 180–200° C. | 32.5 | 3.5 | 6.5 | 6.0 | 7.0 | 8.6 |
| g microcoagulate in 200 g latex 200 μ | none | 0.22 | 0.05 | none | none | none |
| Residual monomer ACN, crude latex according to GC. | 0.3 | 0.146 | 0.223 | 0.156 | 0.16 | 0.13 |
| Outflow time according to DIN 53 211 4 mm φ; ph of crude latex | 12.9 | 14.9 | 14.7 | 14.1 | 15.1 | 14.1 |
| Electrolyte stability: 25g latex pH = 8 +10% NaCl, coagulated after ml | not measurable* | 9.8 | 6.6 | 7.0 | 20 | 18.6 |
| +10% CaCl₂, coagulated after ml | not measurable* | 3.0 | 2.6 | 2.9 | 4 | 3.8 |
| +2.5% CaCl₂, coagulated after | not measurable* too viscous | 7.2 | 6.0 | 6.3 | 10 | 10.4 |
| Water resistance 0 Film from latex with ph of crude latex/grade | 2 D | 2 D | 2 D | 2 D | 2 D | 3 D |
| Film from latex with pH 8/grade | no film producible | 3 D | 3 D | 3 D | 3 D | 4 D |
| Particle size of latex end products | 136 | 110 | 110 | 120 | 142 | 138 |
| Resistance to freezing pH/+ or − (+ = freezing resistant) | 7.0/+ | 8.5/+ | 8.5/+ | 8.5/+ | 8.5/+ | 8.5/+ |

TABLE IV
Continuation 3

| Comparison Experiment | | | IIIA | | IIIB | | IIIC | | IIID | | IIIE | | F | |
|---|---|---|---|---|---|---|---|---|---|---|---|---|---|---|
| pH | pK | UpM | cP | solids content % | cP | solids content % | cP | solids contents % | cP | solids content % | cP | solids contents % | cP | solids content % |
| 7 | 1 | 6 | | | | | | | | | 503 | 44.04 | 144 | 43.89 |
|  |  | 12 | | | | | | | | | 405 | ↓ | 141 | ↓ |
|  |  | 30 | | | | | | | | | | | 126 | ↓ |
|  |  | 60 | | | | | | | | | | | | |
|  | 2 | 6 | | | 3020 | (44.3) | 2785 | (44.4) | 1325 | (44.4) | 535 | ↓ | 160 | ↓ |
|  |  | 12 | | | 1788 | ↓ | 1658 | ↓ | 918 | ↓ | 425 | ↓ | 153 | ↓ |
|  |  | 30 | | | 920 | ↓ | 867 | ↓ | 536 | ↓ | 282 | ↓ | 136 | ↓ |
|  |  | 60 | | | | | | | 355 | ↓ | 199 | ↓ | 112 | ↓ |
|  | 3 | 6 | | | 3600 | ↓ | 3340 | ↓ | 1600 | ↓ | 640 | ↓ | 200 | ↓ |
|  |  | 12 | | | 2120 | ↓ | 2030 | ↓ | 1100 | ↓ | 500 | ↓ | 170 | ↓ |
|  |  | 30 | | | 1088 | ↓ | 1048 | ↓ | 656 | ↓ | 336 | ↓ | 152 | ↓ |
|  |  | 60 | | | 652 | ↓ | 640 | ↓ | 428 | ↓ | 230 | ↓ | 132 | ↓ |
|  | 4 | 6 | 60000 | (42.3) | 5000 | ↓ | 4400 | ↓ | 2200 | ↓ | 700 | ↓ | 300 | ↓ |
|  |  | 12 | 31750 | ↓ | 3000 | ↓ | 2750 | ↓ | 1500 | ↓ | 650 | ↓ | 250 | ↓ |
|  |  | 30 | 13960 | ↓ | 1520 | ↓ | 1400 | ↓ | 880 | ↓ | 460 | ↓ | 220 | ↓ |
|  |  | 60 | 7590 | ↓ | 960 | | 860 | | 570 | | 330 | | 180 | ↓ |
| 8 | 1 | 6 | | | | | | | | | | 43.87 | | 43.72 |

TABLE IV-continued

Continuation 3

| Comparison Experiment pH pK UpM | IIIA cP | solids content % | IIIB cP | solids content % | IIIC cP | solids contents % | IIID cP | solids content % | IIIE cP | solids contents % | F cP | solids content % |
|---|---|---|---|---|---|---|---|---|---|---|---|---|
| 12 | | | | | | | | | | | | |
| 30 | | | | | | | | | | | | |
| 60 | | | | | | | | | | | | |
| 2  6 | | | | | | | | | | | | 1375 | ↓ |
| 12 | | | | | | | | | | | | 895 | ↓ |
| 30 | | | | | | | | | | | | 492 | ↓ |
| 60 | | | | | | | | | | | | 322 | ↓ |
| 3  6 | 15160 | (44.2) | 11960 | (44.3) | 7700 | (44.2) | 11340 | | | | 1760 | ↓ |
| 12 | 8740 | ↓ | 6910 | ↓ | 4450 | ↓ | 6670 | ↓ | | | 448 | ↓ |
| 30 | | ↓ | 3384 | ↓ | 2228 | ↓ | 3376 | ↓ | | | 600 | ↓ |
| 60 | | ↓ | — | ↓ | 1344 | ↓ | | ↓ | | | 386 | ↓ |
| 4  6 | 25000 | ↓ | 17700 | ↓ | 11500 | ↓ | 16400 | ↓ | | | 2500 | ↓ |
| 12 | 13560 | ↓ | 10400 | ↓ | 6650 | ↓ | 9500 | ↓ | | | 1500 | ↓ |
| 30 | 6340 | ↓ | 4900 | ↓ | 3200 | ↓ | 4660 | ↓ | | | 840 | ↓ |
| 60 | 3680 | | 2830 | | 1850 | | 2760 | | | | 830 | ↓ |

TABLE IV

Continuation 4

| Comparison Experiment pH pK UpM | IIIA cP | solids content % | IIIB cP | solids content % | IIIC cP | solids content % | IIID cP | solids content % | IIIE cP | solids content % | F cP | solids content % |
|---|---|---|---|---|---|---|---|---|---|---|---|---|
| 8.5  1  6 | | | | 44.1 | | 44.2 | | 44.1 | | 43.58 | | 43.66 |
| 12 | | | | ↓ | | ↓ | | ↓ | | ↓ | | ↓ |
| 30 | | | | ↓ | | ↓ | | ↓ | | ↓ | | ↓ |
| 60 | | | | ↓ | | ↓ | | ↓ | | ↓ | | ↓ |
| 2  6 | | | | ↓ | | ↓ | | ↓ | | ↓ | 2970 | ↓ |
| 12 | | | | ↓ | | ↓ | | ↓ | | ↓ | 1775 | ↓ |
| 30 | | | | ↓ | | ↓ | | ↓ | | ↓ | 923 | ↓ |
| 60 | | | | ↓ | | ↓ | | ↓ | | ↓ | | ↓ |
| 3  6 | | | | ↓ | | ↓ | | ↓ | | ↓ | 3720 | ↓ |
| 12 | | | | ↓ | | ↓ | | ↓ | | ↓ | 2230 | ↓ |
| 30 | | | | ↓ | | ↓ | | ↓ | | ↓ | 1108 | ↓ |
| 60 | | | | ↓ | | ↓ | | ↓ | | ↓ | 692 | ↓ |
| 4  6 | 53300 | ↓ | 53300 | ↓ | 30700 | ↓ | 36200 | ↓ | | | 5400 | ↓ |
| 12 | 30600 | ↓ | 30000 | ↓ | 17200 | ↓ | 20650 | ↓ | | | 3150 | ↓ |
| 30 | 14640 | ↓ | 14320 | ↓ | 8260 | ↓ | 10160 | ↓ | | | 1640 | ↓ |
| 60 | 8770 | | 8330 | | 4830 | | 6200 | | 42.13 | | 1000 | ↓ |
| 9  1  6 | | | | | | | | | | | | 43.58 |
| 12 | | | | | | | | | | | | ↓ |
| 30 | | | | | | | | | | | | ↓ |
| 60 | | | | | | | | | | | | ↓ |
| 2  6 | | | | | | | | | | | | ↓ |
| 12 | | | | | | | | | | | | ↓ |
| 30 | | | | | | | | | | | | ↓ |
| 60 | | | | | | | | | | | | ↓ |
| 3  6 | | | | | | | | | | | 7700 | ↓ |
| 12 | | | | | | | | | | | 4500 | ↓ |
| 30 | | | | | | | | | | | 2284 | ↓ |
| 60 | | | | | | | | | | | 1398 | ↓ |
| 4  6 | | | | | | | | | 37500 | ↓ | 11500 | ↓ |
| 12 | | | | | >100000 | | | | 21800 | ↓ | 6650 | ↓ |
| 30 | | | | | | | | | 11000 | | 3320 | ↓ |
| 60 | | | | | | | | | 6770 | | 1970 | ↓ |

PARTS DEALING WITH PRACTICAL APPLICATION

White lacquer 1 based on dispersion E obtained according to the invention, Table II 241 g of titanium dioxide (Rutile type), 52 g of water, 3 g of a commercial pigment wetting agent based on a polyacrylate salt (40% in water, e.g. Dispex G 40 ®, trade product of Allied Colloids Manufacturing Co. Ltd., Bradford, England), 3 g of a commercial defoamer for dispersion lacquers based on an ethoxylated soya bean oil and alkaline earth metal stearates, about 80% in mineral oil/petroleum (80:10), 4 g of sodium benzoate as corrosion inhibitor, 1 g of ammonia (25% in water) and 6 g of a commercial thickener based on a polyether urethane (5% in water, e.g. Borchigel L 75 ®, trade product of Gebr. Borchers A, Düsseldorf) are dispersed by means of a dissolver (speed of revolution of dissolver disc=20 m/s) to form a viscous liquid pigment paste. When trituration of the pigment paste has been completed, a mixture of 535 g of copolymer dispersion E, Table II, obtained according to the invention and adjusted to pH 8–8.5 with 20% aqueous $NH_3$, 43 g of butyl diglycol and 65 g of the commercial thickener based on a polyether urethane (20% in water) is added with slow stirring.

When the lacquer is dried at room temperature, it yields hard, high gloss coatings which are free from cracks and are highly stretchable and have excellent durability on a wide variety of substrates such as steel, zinc, aluminium, wood, mineral surfaces, etc. The lacquer can easily be spread by brush and has a very suitable structural index Se for levelling (For the meaning of structural index for the levelling of lacquers, see "Strukturviskose, streichfähige Dickschichtlacke auf Basis von Pergut S 10" by G. Freudenberg and R. Carstens, Farbe and Lack, Year 81, 1/1975, pages 16–21).

White lacquer 2 based on dispersion D obtained according to the invention, Table II 241 g of titanium dioxide (Rutile type), 52 g of water, 3 g of a commercial pigment wetting agent on a poly acrylate resin (40% in water, e.g. Dispex G 40 ® trade product of Allied Colloids Manufacturing Co. Ltd., Bradford, England), 3 g of a commercial defoamer for dispersion lacquers based on an ethoxylated soya bean oil and alkaline earth metal stearates, about 80% in mineral oil/petroleum (80:10), 4 g of sodium benzoate as corrosion inhibitor, 1 g of ammonia (25% in water) and 6 g of a commercial thickener based on a polyether urethane (5%) in water, e.g. Borchigel L 75 ®, trade product of Gebr. Borchers AG. Düsseldorf) are dispersed by means of a dissolver (speed of rotation of dissolver disc=20 m/s) to form a viscous pigment paste. When trituration of the pigment paste has been completed, a mixture of 535 g of copolymer dispersion D obtained according to the invention, Table II, pH 8–8.5, 43 g of butyl diglycol and 65 g of the commercial thickener based on a polyether urethane (20% in water) is added with slow stirring.

When dried at room temperature, the lacquer forms glossy, hard and tack-free coatings which are highly stretchable and have excellent durability on a wide variety of substrates such as steel, zinc, aluminium, wood, mineral surfaces, etc. The lacquer can easily be spread with a brush and has a very suitable structural index Se for levelling (for meaning of structural index for the levelling of lacquers, see "Strukturviskose, streichfähige Dickschichtlacke auf Basis von Pergut S 10" by F. Freudenberg and R. Carstens, Farbe and Lack year 81, 1/1975, page 16–21).

White lacquer based on dispersion F obtained according to the invention, Table II 241 g of titanium dioxide (Rutile type), 52 g of water, 3 g of a commercial pigment wetting agent based on a poly acrylate salt (40% in water, e.g. Dispex G 40 ®, trade product of Allied Colloids Manufacturing Co. Ltd., Bradford, England), 3 g of a commercial defoamer for dispersion lacquers based on an ethoxylated soya bean oil and alkaline earth metal stearates, about 8% in mineral/petroleum (80:10), 4 g of sodium benzoate as corrosion inhibitor, 1 g of ammonia (25% in water) and 6 g of a commercial thickener based on a polyether urethane (5% in water, e.g. Borchigel L 75 ®, trade product of Gebr. Borchers AG, Düsseldorf) are dispersed by means of a dissolver (circumferential speed of dissolver disc=20 m/s) to form a viscous pigment paste. When trituration of the pigment paste has been completed, a mixture of 535 g of copolymer dispersion F obtained according to the invention, Table II, pH 8–8.5, 43 g of butyl diglycol and 65 g of commercial thickener based on a polyether urethane (20% in water) is added with slow stirring.

When dried at room temperature, the lacquer forms glossy, soft but almost tack-free coatings which are exceptionally stretchable and have excellent durability on a wide variety of substrates such as steel, zinc, aluminium, wood, mineral surfaces, etc.

The lacquer can easily be spread with a brush and has a very suitable structural index Se for levelling (for meaning of structural index for the levelling of lacquers see "Strukturviskose, streichfähige Dickschichtlacke auf Pergut S 10" by G. Freudenberg and R. Carstens, Farbe and Lack, year 81, 1/1975, pages 16–21).

Corrosion protective lacquer 1 based on dispersion E obtained according to the invention, Table II 121.5 g of titanium dioxide (Rutile type), 18.5 g of zinc chromate (Type containing a low proportion of water-soluble constituents), 3.5 g of iron oxide black pigment, 3.0 g of iron oxide brown pigment, 26 g of a micronized mica, 26 g of a natural calcium carbonate (particle size 5–20 μm), 39.5 g of a commercial pigment wetting agent (ammonium salt of a low viscosity polyacrylic acid, 3% in water), 4 g of a commercial defoaming agent for dispersion lacquers based on an ethoxylated soya bean oil and alkaline earth metal stearates, about 8% in mineral oil/petroleum (80:10), 4 g of sodium benzoate (as corrosion inhibitor), 10 g of water, 17 g of butyl diglycol acetate and 17.5 g of a commercial thickener based on a polyether urethane (e.g. Borchigel L 75 ®, trade product of Borchers AG, Düsseldorf, 5% in water) are dispersed by means of a dissolver (circumferential speed of dissolver disc=20 m/s) to form a viscous pigment paste. When trituration of the pigment paste has been completed, 680 g of copolymer dispersion E obtained according to the invention, Table II, pH 8–8.5, are added.

When dried at room temperature, the lacquer forms hard coatings which are highly stretchable and free from cracks and have excellent durability on a wide variety of substrates such as steel, zinc, aluminium, wood and mineral surfaces, etc. Resistance to salt spray mist; steel sheets are coated with the lacquer described above to form a film having a thickness of about 100 μm when dry, and are then tested for their resistance to salt spray mist according to DIN 53 167. After 20 days, the test was stopped without any finding.

Corrosion protective lacquer 2 based on dispersion D obtained according to the invention, Table II 121.5 g of titanium dioxide (Rutile type), 18.5 g of zinc chromate (type containing a low proportion of water-soluble constituents), 3.5 g of iron oxide black pigment, 3 g of iron oxide brown pigment, 26 g of a micronized mica, 26 g of a natural calcium carbonate (particle size 5–20 μm), 39.5 g of a commercial pigment wetting agent (ammonium salt of a low viscosity polyacrylic acid, 3% in water), 4 g of a commercial defoaming agent for dispersion lacquers based on an ethoxylated soya bean oil and alkaline earth metal stearates, about 8% in mineral oil/petroleum (80:10), 4 g of sodium benzoate (as corrosion inhibitor), 10 g of water, 17 g of butyl diglycol acetate and 17.5 g of a commercial thickener based on a polyether urethane (e.g. Borchigel L 75 ®, trade product of Borchers AG, Düsseldorf, 5% in water) are dispersed to a viscous pigment paste by means of a dissolver (circumferential speed of dissolver disc=20 m/s). When trituration of the pigment paste has been completed, 680 g of copolymer dispersion D obtained according to the invention, Table II, pH 8-8.5, are added with slow stirring.

When dried at room temperature, the lacquer forms hard, almost tack-free coatings which are highly stretchable and have excellent long term adherence to various substrates such as steel, zinc, aluminium, wood, mineral surfaces, etc. Resistance to salt spray mist: steel sheets were coated with the lacquer described above to form a film having a thickness of about 100 μm when dry and were tested for their resistance to salt spray mist according to DIN 53 167. The test was stopped after 20 days without findings.

White lacquer 4 and corrosion lacquer 4

The 33% dispersion obtained according to U.S. Pat. No. 2,787,603, Example IV and I, i.e. according to Comparison Example I A/Table III/Continuation 2 thickens after the addition of a 10% aqueous NH$_3$ at pH 8 to a paste which cannot be worked up into a white lacquer or corrosion lacquer corresponding to white lacquer 1 or corrosion lacquer 1.

When attempts are made to work up the crude latex of comparison Experiment I A (pH 3.8) to a white lacquer or corrosion lacquer corresponding to white lacquer 1 or corrosion lacquer 1 without the addition of ammonia, the paints coagulate during the process of dispersion.

The properties of films obtained from white lacquers 1 to 3 and corrosion protective lacquers 1 to 3 and from the corresponding lacquers containing commercial dispersions as binders are set forth for comparison in Tables V and VI below.

Table V

Properties of the white lacquers. Dry film thickness 100 μm. For comparison, two white lacquers based on an acrylate/styrene copolymer dispersion and on a pure acrylate dispersion, in each case adjusted to a solids content of 45%, were tested in addition to the lacquers based on the copolymer dispersions according to the invention. The preparation of such comparison white lacquers is carried out according to the method of preparation of white lacquer 1. A comparison of the values given below shows that white lacquers produced using the binders according to the invention are at least partly superior to those produced with the aid of commercial binders.

| White lacquer | Levelling visual[1] | Structural index[2] | Gloss according to DIN 67 530 85° angle | Freedom from tackiness[1] |
|---|---|---|---|---|
| 1 | 2 | −0.35 | 100 | 3 |
| 2 | 2 | −0.32 | 95 | 2 |
| 3 | 2 | −0.32 | 93 | 2-3 |
| Basis Acrylate/ Styrene dispersion | 2-3 | −0.4 | 93 | 3-4 |
| Basis pure acrylate dispersion | 3 | −0.5 | 94 | 2-3 |

[1]General scale of assessment:
0 = excellent
1 = very good
2 = good
3 = satisfactory
4 = unsatisfactory
5 = very poor
[2]Structural index:
0 = Newtonian flow (very good)
−0.9 = high structural viscosity (undesirable)

Determination of freedom from tackiness

The substrate is placed on scales with the lacquer layer uppermost and the scales are balanced with a counterweight of 1 kg. A small, fat-free wad of cotton wool 2 to 3 cm in diameter is placed on the lacquer layer and on this wad is placed on a small metal disc having a diameter of 2 cm. Pressure is applied to the disc with a finger until the scales are balanced and the scales are kept in equilibrium for 10 secones. After removal of the metal disc, attempts are made to remove the wad of cotton wool by gently blowing. The lacquer layer is considered to be free from tackiness if the wad does not stick to the lacquer layer and leaves no hairs on it.

Table VI

Properties of the corrosion protective lacquer, 100 μm dry film thickness, on 1 mm steel sheets.

For comparison, two corrosion protective lacquers based on a commercial acrylate/stryene copolymer dispersion and a pure acrylate dispersion, each adjusted to a solids content of 45% were tested in addition to lacquers based on the copolymer dispersion according to the invention.

The comparison lacquers were prepared in accordance with the method for corrosion protective lacquer 1.

| Corrosion protective lacquer | Pendulum hardness according to Konig | Blocking resistance[1] | Premium blend petrol test | Resistance to salt spray mist DIN 53 167 | Erichen cupping |
|---|---|---|---|---|---|
| 1 | 60 | 3 | 3 | 20 d | >10 mm |
| 2 | 70 | 2 | 2 | 20 d | >10 mm |
| 3 | 130 | 1 | 1 | 20 d | >10 mm |
| Basis acrylate/ styrene dispersion | 40 | 3-4 | 3-4 | 20 d | >10 mm |
| Basis pure acrylate dispersion | 60 | 2-3 | 2-3 | stopped after 15 days due to blistering and sub-surface rusting | >10 mm |

[1]General scale of assessment:
0 = excellent
1 = very good
2 = good
3 = satisfactory
4 = unsatisfactory
5 = very poor The pendulum hardnesses indicated were determined by the method of König in seconds after 1 weeks air drying. (see W. König, Farbe and Lack, 59 (1953), page 435. The lower the value obtained, the softer is the film.

Erichsen cupping (stretchability of film) was measured according to DIN 53 156 in mm. The higher the figure obtained, the more stretchable is the film.

Determination of blocking resistance

Using a doctor wiper (gap 200 μm, width about 60 mm), the dispersion film was drawn over a PVC foil and over a filter paper. After 1 hours drying at 80° C. and 1 hours storage in an air conditioned room at 23° C. and 50% relative humidity, the filter paper is placed with its coated side upwards on the lacquer layer of the PVC foil and loaded with a stamp about 2 cm in diameter for 1 hour. The load is 200 c/cm$^2$. The PVC foil and filter paper are then separated and studied to assess whether the pressure surfaces stick together and what pressure traces are left behind. The general assessment scale according to DIN 53 520 is used.

Determination of the resistance to premium blend petrol

A wad of cotton wool impregnated with premium blend petrol is placed on the lacquer surface for 5 minutes and, after removal of the wad and wiping the surface to remove any residues of solvent, the change in film is immediately assessed by scratching the surface with a finger nail, the following grades of assessment being used:

1 = unaltered hardness of film, i.e. cannot be scratched
2 = only the lacquer surface can be scratched
3 = the lacquer layer can be scratched down to the surface of the metal but only with difficulty
3 = swelling of the lacquer layer is observed and the lacquer can easily be scratched right through to the surface of the metal
5 = partly dissolved.

As can be seen from the table, the films of corrosion protective lacquers containing binders according to the invention have in part a higher pendulum hardness according to König, a higher blocking resistance and resistance to premium blend petrol and higher resistance to salt spray mist than corresponding films of lacquers prepared from the commercial dispersions indicated.

In the following part of practical application, the mechanical properties of test samples prepared from dispersions according to the present invention and from commercial dispersions are compared.

In Tables VII to X, the hardness Shore D and Shore A (according to DIN 53 505) of various products (obtained from dispersions according to the invention and commercial dispersions) is indicated in dependence upon the temperature (°C.) and time of pressure applied (3 and 15 seconds), n being the number of individual measurements. The measurements were carried out on different circular test samples 6 mm in thickness with a diameter of 36.6 mm and a smooth surface.

The circular test samples are punched out of pressed plates 6 mm in thickness. To manufacture these plates, the dispersions were dried in a circulating air-drying cupboard and the clear sheets were treated on a plastics roller at about 50°–60° C. and then rolled out to form sheets about 10 mm in thickness.

These sheets were used to produce pressed plates at a temperature of 110° C., a preliminary pressure of 15 bar applied for 10 minutes and a subsequent pressure of 200 bar applied for 10 minutes. The stamp surface of the press had a diameter of 300 mm.

The following types of polymer were compared:

| | | |
|---|---|---|
| (1) | polymer from dispersion C | (According to the invention |
| (2) | polymer from dispersion D | see table II) |
| (3) | polymer from dispersion E | |
| (4) | polymer from dispersion F | |
| (5) | polymer from dispersion G | |
| (6) | polymer P-1: | from commercial dispersions based on copolymers of n-butyl acrylate, styrene and α, β-unsaturated monocarboxylic acid |
| (7) | polymer P-2: | from commercial dispersions based on copolymers of n-butyl acrylate, styrene, α,β-unsaturated monocarboxylic acid and polymerizable methylol compound |
| (8) | polymer P-3: | from commercial dispersion based on copolymers of esters of acrylic acids |
| (9) | polymer P-4: | from commercial dispersions of a vinyl acetate copolymer |
| (10) | polymer P-5: | from commercial dispersion of a vinyl chloride ethylene copolymer (about 20% ethylene units). |

Tables VII to X also show the temperature $T_{\lambda max.}$ in °C. (see DIN preliminary standard 53 545, range II) in which the logarithmic decrement of mechanical damping in the torsion vibration test (according to DIN 53 520) has a maximum. $T_{\lambda max.}$ is therefore a measure of the main softening range of the particular copolymer.

The thickness of the samples was about 1.5 mm, the width of the samples was 8.0 mm and the clamped length was 40 mm. The vibration disc had a moment of mass inertia of 37.4 kg/mm$^2$ and the tractive force was about 22 KPa (Kilo-Pascal).

All the samples were measured with the same apparatus at the same rate of heating (about 1° C./min.).

Tables VII to X also show the minimum film-forming temperature MFT in °C., measured according to DIN 53 787.

A comparison of the values in Tables VII to X shows that copolymers obtained from dispersions according to the invention have greater hardness than the given commercial products at comparable temperatures of the main softening range, particularly at the higher temperature. At the same time, the minimum film-forming temperature of the copolymers obtained from dispersions according to the invention are lower than the corresponding values of the comparison products inspite of the great hardness. In addition, copolymers of dispersions according to the invention combine great hardness with high tensile stresses (measured according to DIN 53 504) and high elongations, as shown in Tables XI to XII. At elevated temperatures, when the polymers of the commercial products already flow, the products according to the invention still have clearly measurable tensile stresses.

To measure the tensile strengths in [MPa] according to DIN 53 504, copolymers of dispersions C, D, E, F and G according to the invention (Table II) were compared with the copolymers P-1 to P-5 already specified, which were obtained from commercial dispersions.

The test samples used were in the form of S-2 standard rods used according to DIN 53 504.

7 test rods were produced from each product and the tensile stress was measured in dependence upon the elongation (elongation %) at various temperatures (20, 30, 40 and 60° C.). For the % elongation at tearing and strength, the standard deviation is given (see Tables XI and XII).

The standard deviation S for n measurements ($\Sigma \Delta x_i^2$ = sum of error quadrates) is defined by:

$$S = \pm \sqrt{\frac{\Sigma \Delta x_i^2}{(n-1)}}$$

For explanations, see e.g. K. H. Näser, Physikalisch-chemische Rechenaufgaben VEB Deutscher Verlag für Grundstoffindustrie, Leipzig 1970, page 13–15.

The abbreviations in Tables XI to XII have the following meaning:

$E_R$ = Elongation at tearing in %, S = standard deviation,
F = tensile strength (MPa; tensile stress on tearing).

TABLE VII

| Temp. [°C.] | Polymer from Dispersion C | | | | | | Polymer from Dispersion D | | | | | | Polymer from Dispersion E | | | | | |
|---|---|---|---|---|---|---|---|---|---|---|---|---|---|---|---|---|---|---|
| | Shore D | | | Shore A | | | Shore D | | | Shore A | | | Shore D | | | Shore A | | |
| | n | 3″ | 15″ | n | 3″ | 15″ | n | 3″ | 15″ | n | 3″ | 15″ | n | 3″ | 15″ | n | 3″ | 15″ |
| −20 | 6 | 81 | 80 | — | — | — | 6 | 81 | 81 | — | — | — | 6 | 83 | 82 | — | — | — |
| −10 | 6 | 79 | 77 | — | — | — | 6 | 79 | 77 | — | — | — | 6 | 80 | 79 | — | — | — |
| ±0 | 6 | 77 | 75 | — | — | — | 6 | 77 | 75 | — | — | — | 6 | 78 | 78 | — | — | — |
| +10 | 6 | 75 | 72 | — | — | — | 6 | 75 | 72 | — | — | — | 6 | 75 | 73 | 6 | 99 | 99 |
| +20 | 6 | 67 | 63 | 6 | 99 | 99 | 6 | 67 | 63 | 6 | 99 | 99 | 6 | 71 | 68 | 6 | 97 | 96 |
| +30 | 6 | 52 | 43 | 6 | 94 | 91 | | 52 | 43 | 6 | 93 | 87 | 6 | 56 | 47 | 6 | 85 | 73 |
| +40 | — | — | — | 6 | 70 | 58 | | | | 6 | 67 | 53 | 6 | 31 | 21 | 6 | 51 | 41 |
| +50 | — | — | — | 6 | 43 | 39 | | | | 6 | 42 | 39 | 6 | 13 | 9 | 6 | 36 | 34 |
| +60 | — | — | — | 6 | 37 | 34 | | | | 6 | 37 | 33 | | | | 6 | 33 | 30 |
| +70 | — | — | — | 6 | 34 | 31 | | | | 6 | 33 | 31 | | | | 6 | 25 | 20 |
| +80 | — | — | — | 6 | 29 | 25 | | | | 6 | 27 | 21 | | | | | | |
| MFT [°C.] | +15 | | | | | | +12 | | | | | | +15 | | | | | |
| Tλ$_{max}$ [°C.] | +43 | | | | | | +40 | | | | | | +37.5 | | | | | |

TABLE VIII

| Temp. [°C.] | Polymer from Dispersion F | | | | | | Polymer from Dispersion G | | | | | | |
|---|---|---|---|---|---|---|---|---|---|---|---|---|---|
| | Shore D | | | Shore A | | | Shore D | | | Shore A | | | |
| | n | 3″ | 15″ | n | 3″ | 15″ | n | 3″ | 15″ | n | 3″ | 15″ | |
| −20 | 6 | 79 | 78 | — | — | — | 6 | 80 | 79 | — | — | — | |
| −10 | 6 | 74 | 72 | — | — | — | 6 | 77 | 75 | — | — | — | |
| 0 | 6 | 72 | 69 | — | — | — | 6 | 73 | 78 | — | — | — | |
| +10 | 6 | 61 | 56 | — | — | — | 6 | 64 | 59 | — | — | — | |
| +20 | 6 | 34 | 25 | 6 | 86 | 73 | 6 | 44 | 36 | 6 | 90 | 84 | |
| +30 | — | — | — | 6 | 68 | 55 | — | — | — | 6 | 74 | 63 | |
| +40 | — | — | — | 6 | 43 | 38 | — | — | — | 6 | 48 | 41 | |
| +50 | — | — | — | 6 | 35 | 32 | — | — | — | 6 | 37 | 34 | |
| +60 | — | — | — | 6 | 31 | 27 | — | — | — | 6 | 33 | 30 | |
| +70 | — | — | — | 6 | 28 | 23 | — | — | — | 6 | 32 | 29 | |
| +80 | — | — | — | 6 | 23 | 19 | — | — | — | 6 | 27 | 25 | |
| MFT [°C.] | +3 | | | | | | +8 | | | | | | |
| Tλ$_{max}$ [°C.] | +31 | | | | | | +35 | | | | | | |

TABLE IX

| Temp. °C. | P1 Acrylate-styrene copolymer | | | | | | P2 Acrylate styrene copolymer | | | | | | P3 Pure Acrylate copolymer | | | | | |
|---|---|---|---|---|---|---|---|---|---|---|---|---|---|---|---|---|---|---|
| | Shore D | | | Shore A | | | Shore D | | | Shore A | | | Shore D | | | Shore A | | |
| | n | 3″ | 15″ | n | 3″ | 15″ | n | 3″ | 15″ | n | 3″ | 15″ | n | 3″ | 15″ | n | 3″ | 15″ |
| −20 | 9 | 76 | 75 | — | — | — | 18 | 79 | 78 | — | — | — | 3 | 83 | 82 | — | — | — |
| −10 | 9 | 74 | 73 | — | — | — | 18 | 76 | 75 | — | — | — | 3 | 81 | 80 | — | — | — |
| ±0 | 9 | 72 | 70 | — | — | — | 18 | 73 | 71 | — | — | — | 3 | 76 | 74 | — | — | — |
| +10 | 9 | 69 | 66 | — | — | — | 18 | 67 | 62 | — | — | — | 3 | 74 | 70 | — | — | — |
| +20 | 9 | 50 | 40 | 9 | 90 | 86 | 18 | 32 | 20 | 18 | 80 | 62 | 3 | 55 | 45 | 3 | 96 | 92 |
| +30 | 9 | 25 | 14 | 9 | 72 | 54 | 18 | 13 | 7 | 18 | 57 | 42 | — | — | — | 3 | 78 | 62 |
| +40 | — | — | — | 9 | 32 | 26 | 18 | 31 | — | 18 | 31 | 25 | — | — | — | 3 | 51 | 40 |
| +50 | — | — | — | 9 | 24 | 21 | — | — | — | 18 | 21 | 17 | — | — | — | 3 | 35 | 29 |
| +60 | — | — | — | 9 | 20 | 16 | — | — | — | 18 | 17 | 13 | — | — | — | 3 | 25 | 19 |
| +70 | — | — | — | 9 | 13 | 10 | — | — | — | 18 | 13 | 9 | — | — | — | 3 | 22 | 17 |
| +80 | — | — | — | 9 | 10 | 7 | — | — | — | 18 | 10 | 7 | — | — | — | — | — | — |
| Tλ$_{max}$ [°C.] | +38 | | | | | | +35.5 | | | | | | +38 | | | | | |
| MFT [°C.] | +22 | | | | | | +16 | | | | | | +18 | | | | | |

TABLE X

| Temp. °C. | P4 Vinyl acetate/acrylate copolymer | | | | | | P5 Vinyl chloride/ethylene copolymer | | | | | |
|---|---|---|---|---|---|---|---|---|---|---|---|---|
| | Shore D | | | Shore A | | | Shore D | | | Shore A | | |
| | n | 3″ | 15″ | n | 3″ | 15″ | n | 3″ | 15″ | n | 3″ | 15″ |
| −20 | 3 | 83 | 83 | — | — | — | 3 | 80 | 79 | — | — | — |
| −10 | 3 | 83 | 82 | — | — | — | 3 | 77 | 75 | — | — | — |
| ±0 | 3 | 79 | 77 | — | — | — | 3 | 73 | 70 | — | — | — |
| +10 | 3 | 71 | 65 | — | — | — | 3 | 65 | 60 | 3 | 97 | 97 |
| +20 | 3 | 46 | 34 | 3 | 94 | 88 | — | — | — | 3 | 86 | 75 |
| +30 | — | — | — | 3 | 70 | 53 | — | — | — | 3 | 57 | 49 |
| +40 | — | — | — | 3 | 37 | 27 | — | — | — | 3 | 41 | 33 |
| +50 | — | — | — | 3 | 24 | 16 | — | — | — | 3 | 27 | 20 |
| +60 | — | — | — | 3 | 13 | 6 | — | — | — | 3 | 17 | 12 |
| +70 | — | — | — | 3 | 7 | 2 | — | — | — | 3 | 8 | 4 |
| +80 | — | — | — | — | — | — | — | — | — | — | — | — |
| Tλ$_{max}$ [°C.] | +28 | | | | | | +27 | | | | | |
| MFT [°C.] | +9 | | | | | | +18 | | | | | |

TABLE XI

| | Tensile stresses in MPa according to DIN 53504, 7 measurements for each value given at °C. | | | | | | | | | | | | | | | | | | | |
|---|---|---|---|---|---|---|---|---|---|---|---|---|---|---|---|---|---|---|---|---|
| | 20° C. copolymers from dispersion according to the invention | | | | | 30° C. copolymers from dispersion according to the invention | | | | | 40° C. copolymers from dispersion according to the invention | | | | | 60° C. copolymers from dispersion according to the invention | | | | |
| Elongation of | C | D | E | F | G | C | D | E | F | G | C | D | E | F | G | C | D | E | F | G |
| 50 | 17.4 | 15.7 | 11.2 | 6.6 | 9.3 | 9.8 | 8.0 | 4.4 | 1.4 | 3.3 | 2.9 | 2.0 | 1.2 | 0.7 | 0.9 | 0.5 | 0.4 | 0.4 | 0.3 | 0.4 |
| 100 | 17.7 | 15.8 | 11.1 | 7.5 | 10.3 | 10.4 | 9.1 | 5.2 | 2.3 | 4.4 | 3.9 | 2.8 | 1.4 | 0.8 | 1.3 | 0.7 | 0.6 | 0.4 0.5 | | |

TABLE XI-continued

| | Tensile stresses in MPa according to DIN 53504, 7 measurements for each value given at °C. | | | | | | | | | | | | | | | | | | | |
|---|---|---|---|---|---|---|---|---|---|---|---|---|---|---|---|---|---|---|---|---|
| | 20° C. copolymers from dispersion according to the invention | | | | | 30° C. copolymers from dispersion according to the invention | | | | | 40° C. copolymers from dispersion according to the invention | | | | | 60° C. copolymers from dispersion according to the invention | | | | |
| Elongation of | C | D | E | F | G | C | D | E | F | G | C | D | E | F | G | C | D | E | F | G |
| 150 | 19.4 | 16.4 | 12.2 | 9.4 | 12.1 | 11.8 | 10.7 | 6.0 | 3.0 | 5.5 | 5.1 | 3.7 | 1.8 | 1.1 | 1.8 | 0.8 | 0.8 | 0.6 | 0.5 | 0.7 |
| 200 | 21.2 | 17.8 | 14.5 | 11.8 | 15.1 | 14.8 | 13.2 | 7.2 | 4.2 | 7.2 | 6.8 | 4.9 | 2.3 | 1.3 | 2.5 | 1.1 | 1.0 | 0.6 | 0.7 | 0.8 |
| 250 | 23.9 | 20.4 | 17.3 | 15.8 | 18.4 | 17.6 | 16.5 | 8.8 | 5.5 | 8.8 | 9.0 | 6.3 | 2.6 | 1.7 | 3.2 | 1.3 | 1.1 | 0.7 | 0.7 | 1.0 |
| 300 | — | — | 19.7 | 19.8 | 21.7 | 22.8 | 22.2 | 10.9 | 7.8 | 12.0 | 12.2 | 8.9 | 3.1 | 2.2 | 4.1 | 1.5 | 1.3 | 0.8 | 0.8 | 1.3 |
| 350 | | | | 23.1 | 24.0 | | | 13.2 | 10.7 | 13.7 | 16.9 | 12.5 | 3.8 | 2.8 | 5.1 | 1.8 | 1.5 | 0.9 | 0.9 | 1.5 |
| 400 | | | | | | | | 14.2 | 14.3 | | 20.4 | 15.8 | 4.6 | 3.5 | 6.3 | 1.9 | 1.7 | 0.9 | 1.0 | 1.7 |
| 450 | | | | | | | | | | | | | 5.7 | 4.7 | 8.2 | 2.2 | 2.0 | 0.9 | 1.1 | 2.0 |
| 500 | | | | | | | | | | | | | | 5.9 | | 2.7 | 2.3 | 1.0 | 1.2 | 2.3 |
| 550 | | | | | | | | | | | | | | 7.8 | | 2.9 | 2.6 | 0.9 | 1.3 | 2.2 |
| 600 | | | | | | | | | | | | | | | | 3.3 | 2.5 | 1.2 | 1.4 | 2.9 |
| 650 | | | | | | | | | | | | | | | | | 2.8 | 1.2 | 1.6 | |
| $E_R$ %* | 235 | 245 | 290 | 335 | 310 | 310 | 275 | 390 | 390 | 360 | 380 | 390 | 485 | 513 | 410 | 565 | 565 | 675 | 680 | 480 |
| S | ±18 | 34 | 10 | 36 | 39 | 10 | 42 | 30 | 22 | 39 | 18 | 16 | 26 | 50 | 55 | 100 | 50 | 47 | 80 | 87 |
| F(MPa)** | 23.4 | 21.5 | 19.7 | 22.7 | 22.2 | 23.7 | 17.3 | 14.8 | 13.8 | 14.9 | 18.7 | 16.4 | 7.0 | 7.0 | 7.7 | 3.6 | 2.7 | 1.2 | 1.7 | 2.3 |
| S | ±1.3 | 1.4 | 0.5 | 3.5 | 2.8 | 1.7 | 4.6 | 1.5 | 2.0 | 2.2 | 1.7 | 3.5 | 0.1 | 1.7 | 1.6 | 0.5 | 0.4 | 0.2 | 0.3 | 0.5 |

*Elongation on tearing $E_R$ (%)
**Strength F(MPa)

TABLE XII

| | Tensile stresses in MPa according to DIN 53504, 7 measurements each, figures are mean values at °C. | | | | | | | | | | | | | | | | | | | |
|---|---|---|---|---|---|---|---|---|---|---|---|---|---|---|---|---|---|---|---|---|
| | 20° C.; copolymers from commercial dispersion | | | | | 30° C.; copolymers from commercial dispersion | | | | | 40° C.; copolymers from commercial dispersion | | | | | 60° C.; copolymers from commercial dispersion | | | | |
| Elongation of | P1 | P2 | P3 | P4 | P5 | P1 | P2 | P3 | P4 | P5 | P1 | P2 | P3 | P4 | P5 | P1 | P2 | P3 | P4 | P5 |
| 50 | | | | | | | | 4.1 | 2.1 | 1.7 | | | 1.3 | 0.6 | 0.8 | | | | 0.1 | |
| 100 | 5.0 | 3.2 | 13.4 | 7.9 | 8.7 | | | 4.4 | 2.8 | 2.3 | 0.8 | 0.6 | 1.7 | 0.8 | 1.1 | | | | 0.2 | |
| 150 | | | 14.2 | 8.3 | 10.8 | | | 5.3 | 3.2 | 3.1 | | | 2.3 | 0.9 | 1.4 | | | | | |
| 200 | | | 15.7 | 8.9 | 12.7 | | | 6.5 | 3.7 | 3.7 | | | 3.1 | 1.1 | 1.6 | | | | 0.2 | |
| 250 | | | 16.8 | 9.9 | 14.3 | | | 7.7 | 4.3 | 4.4 | | | 3.8 | 1.3 | 1.8 | | | | | |
| 300 | 6.2 | 5.0 | | 11.2 | 14.6 | | | | 5.2 | 5.1 | 2.0 | 1.3 | 3.9 | 1.4 | 2.0 | | | | 0.2 | |
| 350 | | | | 12.6 | | | | | 5.7 | 5.9 | | | 4.8 | 1.5 | 2.2 | | | | | |
| 400 | | | | | | | | | 6.2 | 6.7 | | | | 1.8 | 2.4 | | | | 0.1 | |
| 450 | | | | | | | | | 6.6 | 7.6 | | | | 1.8 | 2.5 | | | | | |
| 500 | | | | | | | | | 6.1 | 7.4 | | | | 2.0 | 2.7 | | | | 0.1 | |
| 550 | | | | | | | | | 6.7 | | | | | 2.1 | 2.8 | | | | | |
| 600 | | | | | | | | | | | | | | 2.2 | 2.9 | | | | | |
| 650 | | | | | | | | | | | | | | 2.3 | 2.9 | | | | | |
| $E_R$ % | 310 | 420 | 240 | 370 | 280 | | | 315 | 455 | 470 | 430 | 45 | 330 | 570 | 730 | | | | 1000 | |
| S | ±15 | 6 | 17 | 13 | 15 | | | 40 | 66 | 53 | 15 | 40 | 52 | 150 | 33 | | | | | |
| F(MPa) | 7.9 | 7.1 | 16.7 | 13 | 14.9 | | | 9.8 | 6.7 | 7.8 | 2.8 | 3.2 | 5.0 | 2.3 | 3.2 | | | | 0.1 | |
| S | ±0.2 | 0.1 | 0.7 | 0.7 | 0.8 | | | 0.5 | 0.8 | 0.7 | 0.1 | 0.1 | 0.3 | 0.5 | 0.3 | | | | — | |

We claim:
1. A finely divided aqueous dispersion having an average particle diameter ranging from 0.1 to 0.15μ and a solids content of from 40 to 50% by weight of at least one copolymer of copolymerized units of:
(A) 20 to 48% by weight of acrylonitrile in which 40 to 60% by weight of the given quantity of acrylonitrile may be replaced by styrene,
(B) 47.5 to 70.5% by weight of n-butyl acrylate,
(C) 3.5 to 4.5% by weight of methacrylic acid or of a mixture of methacrylic and acrylic acid comprising not more than 50% by weight of acrylic acid, and
(D) 0 to 5% by weight of N-methoxymethyl-methacrylamide, in which the sum of the percentages is 100, obtainable by emulsion polymerization with exclusion of air and with stirring until virtually complete conversion of the monomers at temperatures of 30° to 70° C. in the presence of an emulsifier and of a water-soluble initiator system with the addition of part of the monomers (A) to (D), part of the emulsifier dissolved in water and part of the initiator system dissolved in water to an initially introduced mixture of water, monomer mixture and emulsifier after polymerization has been released obtainable by the combination of the following measures and the following components
I.
(a) 59.7 to 48.4% by weight of water ($p_{H2O\ total}$) wherein $p_{H2O\ total} = p_{H2O\ E.v.} + p_{H2O\ Ox.v.} + p_{H2O\ Red.v.} + p_{H2O\ e.n.} + p_{H2O\ Ox.n.} + p_{H2O\ red.n.}$,
(b) 40.0 to 50.0% by weight of monomer mixture $p_{Mon.total}$ of components (A) to (D), wherein $p_{Mon.total} = p_{Mon.v.} + o_{Mon.n.}$,
(c) 0.25 to 2.0% by weight of emulsifier $p_{E.total}$, wherein $p_{E.total} = p_{E.v.} + p_{E.n.}$, and
(d) 0.025 to 0.4% by weight of an initiator system $p_{I.total}$, wherein
$p_{I.\ total}$ stands for $p_{I.v.} + p_{I.n.} = p_{Ox.v.} + p_{Red.v.} + p_{Ox.n.} + p_{Red.n.} = p_{Ox.\ total} + p_{Red.\ total}$,
wherein the initiator system $p_{I.\ total}$ consists of potassium or ammonium peroxidisulphate or a mixture thereof or of the aforementioned persulphates and sodium or potassium pyrosulphite or a mixture thereof, wherein the emulsifier is the ammonium salt of the acid sulphuric acid ester of the addition product of an average of 10 mol of ethylene oxide and 1 mol of lauryl alcohol, and wherein the composition of the monomer mixture of monomers (A) to (D) corresponds to the integral composition of the desired copolymer, and the sum of the percentages by weight of components 1a to 1d is 100;

II.
 (a) The ratio $k_{Mon.}$ of the quantity of monomers initially introduced into the reaction vessel, $p_{Mon.v.}$, to the sum of the quantity of monomers initially introduced and the total quantity of water initially introduced in the $p_{H2O\ v.\ total} = p_{H2O\ E.v.} + p_{H2O\ Ox.v.} + p_{H2O\ Red.v.}$ amounts to:

$$k_{Mon.} = \frac{p_{Mon.v.}}{(p_{Mon.v.} + p_{H2O\ v.\ total})} \times 100 = 5.0\text{-}20,$$

(b) The concentration $[E]_v$ of the quantity of emulsifier initially introduced $p_{E.v.}$ in the total quantity of water initially introduced, $p_{H2O\ v.\ total}$ amounts to:

$$[E]_v = \frac{p_{E.v.}}{p_{H2O\ v.\ total}} \times 1000 = 2\text{-}40,$$

(c) The concentration $[I]_v$ of the quantity of initiator initially introduced $p_{I.v.} = p_{Ox.v.} + p_{Red.v.}$, in the total quantity of water initially introduced, $p_{H2O\ v.\ total}$, amounts to:

$$[I]_v = \frac{p_{I.v.}}{p_{H2O\ v.\ total}} \times 1000 = 0.5\text{-}4$$

(d) The proportion by weight $k_I$ of pyrosulphite to persulphate has a value in the following range:

$$k_I = \frac{p_{Red.total}}{p_{Ox.total}}\ 0\text{-}4,$$

wherein the value 0 is applicable at polymerization temperatures above 55° C. to 70° C. and the values $>0$ to 4 are applicable at polymerization temperatures in the range of 30°-70° C., (e) The proportion by weight $v_{Mon.}$ of the quantity of monomer initially introduced to the total quantity of monomer used has been fixed at the following values:

$$v_{Mon.} = \frac{p_{Mon.v.}}{(p_{Mon.v.} + p_{Mon.n.})} \times 100 = 2\text{-}15,\text{ and}$$

III. The mixture initially introduced, consisting of components $p_{H2O\ E.v.} + p_{Mon.v.} + p_{E.v.}$ is heated to the desired polymerization temperature which lies in the range of from 30° to 70° C., components $p_{Ox.v.}$ dissolved in $p_{H2O\ Ox.v.}$ and $p_{Red.v.}$ dissolved in $p_{H2O\ Red.v.}$ are added simultaneously but separately, and a constant polymerization temperature has been maintained, if necessary with cooling, and the remaining components, $p_{Mon.m.}$, $p_{E.n.}$, dissolved in $p_{H2O\ E.n.}$ and $p_{I.n.} = p_{Ox.n.} +$ Red.n. dissolved in $p_{H2O\ Ox.n.}$ and $p_{H2O\ Red.\ n.}$ have been continuously added to the polymerizing mixture in the course of 2 to 8 hours and the mixture has subsequently been stirred 2-4 hours at the polymerization temperature.

* * * * *